(12) United States Patent
Kim et al.

(10) Patent No.: US 10,433,102 B2
(45) Date of Patent: Oct. 1, 2019

(54) METHOD FOR PROVIDING POSITION ASSOCIATED INFORMATION AND ELECTRONIC DEVICE SUPPORTING THE SAME

(71) Applicant: Samsung Electronics Co., Ltd., Suwon-si (KR)

(72) Inventors: Hye Jeong Kim, Suwon-si (KR); Chae Man Lim, Seoul (KR); Sung Rae Cho, Yongin-si (KR); Yun Sang Park, Suwon-si (KR); Moon Gyo Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/871,914

(22) Filed: Jan. 15, 2018

(65) Prior Publication Data
US 2018/0206067 A1  Jul. 19, 2018

Related U.S. Application Data

(63) Continuation of application No. 14/730,075, filed on Jun. 3, 2015, now abandoned.

(30) Foreign Application Priority Data

Jun. 3, 2014 (KR) .................. 10-2014-0067316

(51) Int. Cl.
*H04W 4/02* (2018.01)
*G01S 19/13* (2010.01)

(52) U.S. Cl.
CPC ............... *H04W 4/02* (2013.01); *G01S 19/13* (2013.01)

(58) Field of Classification Search
CPC ........ H04W 4/02; H04W 64/003; G01S 19/13
See application file for complete search history.

(56) References Cited

U.S. PATENT DOCUMENTS

| | | | |
|---|---|---|---|
| 7,096,030 B2 | 8/2006 | Huomo | |
| 7,151,939 B2 | 12/2006 | Sheynblat | |
| 8,396,485 B2 | 3/2013 | Grainger et al. | |
| 8,620,393 B2 | 12/2013 | Bornstein et al. | |
| 8,755,824 B1* | 6/2014 | Wang | H04W 4/021 455/456.3 |
| 9,390,279 B2 | 7/2016 | Raghupathy et al. | |
| 9,998,864 B2* | 6/2018 | Kumar | H04W 4/029 |
| 2009/0312032 A1* | 12/2009 | Bornstein | G01S 19/48 455/456.1 |
| 2012/0149387 A1* | 6/2012 | Rawat | H04W 4/02 455/456.1 |
| 2013/0276017 A1* | 10/2013 | Walker | H04N 21/44204 725/25 |
| 2014/0087758 A1* | 3/2014 | Maor | G01S 5/0252 455/456.1 |
| 2015/0105108 A1 | 4/2015 | Lee | |

* cited by examiner

*Primary Examiner* — Joseph E Dean, Jr.

(57) ABSTRACT

A position associated information providing method, implemented by an electronic device supporting the same, includes identifying a condition of position information set to an application running or execution-requested, obtaining position information corresponding to the identified condition of the position information, and providing the obtained position information to the application.

20 Claims, 11 Drawing Sheets

METHOD FOR PROVIDING POSITION ASSOCIATED INFORMATION AND ELECTRONIC DEVICE SUPPORTING THE SAME

CROSS-REFERENCE TO RELATED APPLICATION(S) AND CLAIM OF PRIORITY

The present application is a continuation of U.S. patent application Ser. No. 14/730,075 filed on Jun. 3, 2015, which claims the benefit of Korean Patent Application No. 10-2014-0067316 filed on Jun. 3, 2014, the contents of which are incorporated hereby by reference.

TECHNICAL FIELD

The present disclosure relates to providing position associated information.

BACKGROUND

As digital technology is developed, a variety of mobile electronic devices capable of processing personal information are released, such as a Personal Digital Assistant (PDA), a digital diary, a smart phone, a tablet PC, etc. Mobile convergence is made to encompass traditional areas of the electronic devices and areas of other electronic devices.

An electronic device uses a Global Positioning System (GPS) module to receive its own position information. However, the GPS module consumes a lot of power during driving, and in a shadow area where the GPS does not recognize its own position.

SUMMARY

To address the above-discussed deficiencies, various embodiments of this disclosure provide a position associated information providing method and an electronic device capable of minimizing power consumption and providing appropriate position information, thereby making it possible to provide position based service information. Certain embodiments of this disclosure provide an electronic device which includes a control module and a display module. The control module controls to identify a specific requirement of position information related to an application running or execution-requested and to collect position information corresponding to the identified specific requirement of the position information. The display module outputs an execution screen of an application that uses the collected position information.

In accordance with another embodiment of the present disclosure, a method for providing position associated information in an electronic device is provided. The method includes identifying a condition of position information set to an application running or execution-requested; collecting position information corresponding to the identified condition of the position information; and providing the collected position information to the application.

Other embodiments, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
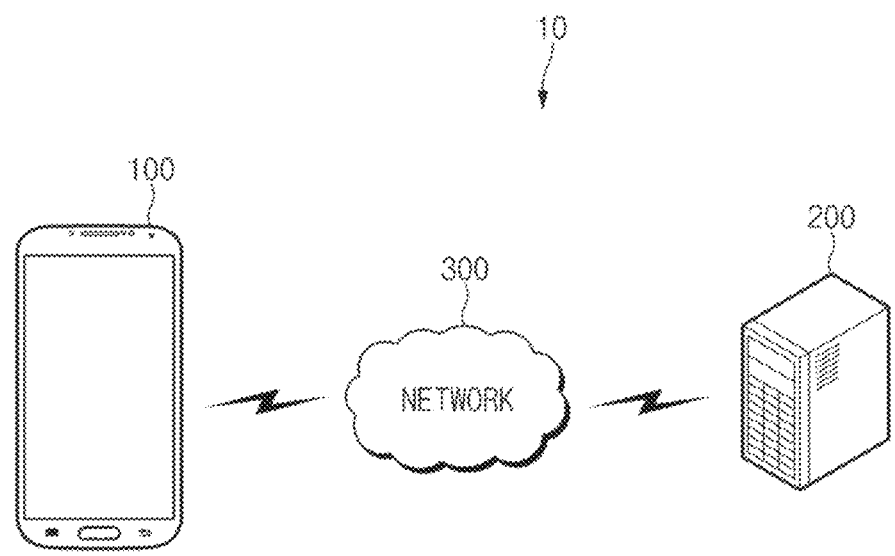
FIG. 1 illustrates a position associated information providing system according to embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Hereinafter, the present disclosure is described with reference to the accompanying drawings. Various modifications are possible in various embodiments of the present disclosure and embodiments are illustrated in drawings and related detailed descriptions are listed. Thus, it is intended that the present disclosure covers modifications and variations of this disclosure provided they come within the scope of the appended claims and their equivalents. With respect to the descriptions of the drawings, like reference numerals refer to like elements.

FIG. 1 illustrates a position associated information providing system according to embodiments of the present disclosure.

An information providing system 10 according to embodiments of the present disclosure may contain an electronic device 100, a service device 200, and a network 300.

In the information providing system 10, the electronic device 100 may receive position information using at least one of various position information receiving manners (or ways, or means, or methods). In this operation, the information providing system 10 may use at least one of a position information receiving manner, a module (e.g., a GPS module) configured to collect position information and installed at the electronic device 100, and a manner of receiving position information that the server device 200 provides. Also, the information providing system 10 may use a manner of calculating a position based on a communication module equipped at the electronic device 100. The information providing system 10 may use the above-described manners adaptively according to a device management state, thereby minimizing the use of power of the electronic device 100 and making it possible to use a service appropriately.

The electronic device 100 may receive position information using a module for collecting position information, for example, a GPS module included therein. The electronic device 100, also, may receive position information using various communication modules. According to certain embodiments, the electronic device 100 may include a cellular communication module and may connect with the server device 200, which provides a cellular communication service, through the network 300. The electronic device 100 may request position information about a specific point at the server device 200 that provides the cellular communication service. For example, the electronic device 100 may acquire information about whether any base stations are placed at the specific point, from the server device 200. Alternatively, the electronic device 100 may acquire current position information calculated using a plurality of base stations, from the server device 200. Alternatively, the electronic device 100 may independently or automatically calculate current position information using information of a base station arranged to be adjacent to the electronic device 100.

According to an embodiment, the electronic device 100 may include a Wi-Fi communication module and may connect with the server device 200, which provides a Wi-Fi communication service, through the network 300. The electronic device 100 may receive position information about a currently connected Access Point (AP) from the server device 200. In this operation, the electronic device 100 may receive the current position information calculated based on a plurality of access points, from the server device 200. Alternatively, the electronic device 100 may independently or automatically calculate current position information based on a plurality of access points.

According to an embodiment, the electronic device 100 may receive position associated information, for example, map information from the server device 200 and may store the received position associated information. The electronic device 100 may estimate a current position based on the stored map information and movement information of a device. Here, position associated information may include at least one of current position information, map information within a constant range on the basis of a current position, arrangement information of a base station and an access point within a constant range on the basis of an related specific point, etc.

Regarding a currently running application, the electronic device 100, as described above, may adaptively use at least one of a position information collection manner using a device component (e.g., a GPS module) for collecting position information, a position information collection manner using a cellular communication module, a position information collection manner using a Wi-Fi communication module, and a position information collection manner using a sensor. According to an embodiment, when a first application necessitating first accuracy is running, the electronic device 100 may collect (or obtain) position information based on the GPS module. According to an embodiment, when a second application necessitating second accuracy is running, the electronic device 100 may collect position information based on the Wi-Fi communication module. According to an embodiment, when a third application of which the accuracy is variable is running, the electronic device 100 may adaptively use at least one of the position information collection manner using the GPS module, the position information collection manner using the cellular communication module, the position information collection manner using the Wi-Fi communication module, and a position information collection manner based on path tracking, according to changed accuracy. The above-described accuracy may vary with a form that a relevant apparatus requires. Here, the accuracy level may be a constant range. For example, the accuracy level may be a range, such as radius of 100 m, radius of 500 m, radius of 1 Km, etc., a specific administrative district range, etc.

The network 300 may form a communication channel between the electronic device 100 and the server device 200. The network 300 may include a variety of network device components according to types and characteristics of communication modules included in the electronic device 100. For example, the network 300 may include a network device component associated with supporting of cellular communication of the electronic device 100. The network 300, also, may include a network device component associated with supporting of Wi-Fi communication of the electronic device 100. The network 300 may not be limited by a specific communication manner, but it may be configured to support at least one of various communication manners associated with data exchange between the electronic device 100 and the server device 200.

The server device 200 may form a channel for communication with the network 300 and may provide information according to connection of the electronic device 100. For example, the server device 200 may provide information associated with a specific communication module included in the electronic device 100. According to an embodiment, the server device 200 may receive position information about a specific point from the electronic device 100. The server device 200 may provide the electronic device 100 with position information of at least one of a cellular base station and an access point arranged within the specific point. According to an embodiment, the server device 200 may provide the electronic device 100 with position information about at least one of cellular base stations, of which the number is predetermined, and access points, of which the number is predetermined, on the basis of the specific point.

According to various embodiments, the server device 200 may calculate position information using at least one of position information of a cellular communication based electronic device 100 and position information of a Wi-Fi communication based electronic device 100. For example, the server device 200 may provide the electronic device 100 with current position information of the electronic device 100 based on information of an access point or a cell to which the electronic device 100 currently belongs. In this operation, in the event that the electronic device 100 is placed in a communication-possible range of a plurality of cells or APs, the server device 200 may calculate position information of the electronic device 100 based on the communication-possible range of the plurality of cells or APs. The server device 200 may provide the calculated position information to the electronic device 100.

The above-described server device 200 may include a device for providing cellular communication based position information, a device for providing Wi-Fi communication based position information, and a device for providing map information of a specific district or region. Also, each of the above-described devices may be implemented with an independent server device. Regarding providing of position information, the server device 200 may include a communication module for communicating with the network 300, a server control module associated with providing and processing of position information of the electronic device 100, and a server storage module for storing position information.

Figure 2:
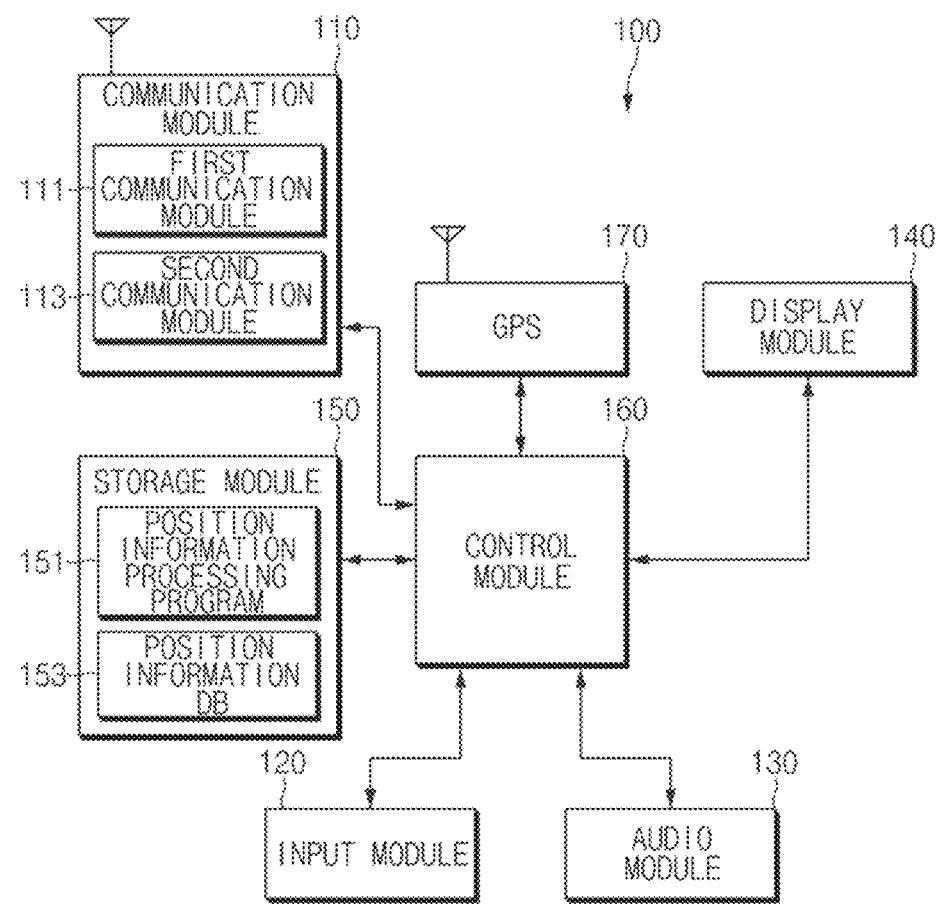
FIG. 2 illustrates an electronic device according to embodiments of the present disclosure.

FIG. 2 illustrates an electronic device according to embodiments of the present disclosure.

The electronic device 100 includes a communication module 110, an input module 120, an audio module 130, a display module 140, a storage module 150, a control module 160, and a GPS module 170.

The communication module 110 may support a communication function of the electronic device 100. According to an embodiment, the communication module 110 contains a first communication module 111 and a second communication module 113. The first communication module 111 may be, for example, a cellular communication module. The first communication module 111 may communicate with at least one base station included in a network 300 to form a communication channel. According to an embodiment, the first communication module 111 may transmit identification information of the electronic device 100 to a server device 200 through the network 300. The first communication module 111 may receive information associated with its own position from the server device 200. According to certain embodiments, the first communication module 111, under a control of the control module 160, requests position information of at least one base station disposed in a specific region at the server device 200 and receives the requested position information from the server device 200. According to certain embodiments, the first communication module 111 may request map information at the server device 200 under a control of the control module 160 and may receive relevant map information from the server device 200.

The second communication module 113 may be a Wi-Fi communication module. The second communication module 113 may communicate with at least one AP included in the network to form a communication channel. According to certain embodiments, the second communication module 113 may connect with the server device 200 using the AP and the formed communication channel. The second communication module 113 may receive current position information from the server device 200. The second communication module 113 may request information of at least one AP arranged at a specific point at the server device 200 and may receive it from the server device 200. The second communication module 113 may request map information of the specific point at the server device 200 and may receive it from the server device 200.

The input module 120 may generate an input signal of the electronic device 100. According to certain embodiments, the input module 120 may generate an input signal for selecting a specific position information collection manner of the electronic device 100. When the specific position information collection manner is selected by the input module 120, there is enabled (or activated) a device component associated with the specific position information collection manner thus selected. The input module 120 may generate an input signal associated with activation or end of a specific application that uses the specific position information collection manner. According to certain embodiments, the input module 120 may produce an input signal associated with activation or end of a Geo-Fence function for providing a function related to each position.

The audio module 130 may perform audio processing of the electronic device 100. For example, the audio module 130 may output audio source data in playing an audio source. The audio module 130 may collect and output audio source data in performing a call function. According to certain embodiments, the audio module 130 may output a guide sound or an effect sound associated with activation and end of an application to which the specific position information collection manner is applied. For example, the audio module 130 may output audio data when the electronic device 100 is placed at a specific point during execution of the Geo-Fence function.

The display module 140 may output various screens associated with operations of the electronic device 100. For example, the display module 140 may output a sleep screen, a lock screen, a standby screen, a menu screen, etc. According to certain embodiments, the display module 140 may output an icon or menu item associated with at least one application that uses the specific position information collection manner. The display module 140 may output an application activation screen when an event associated with activation of a relevant application is generated. The display module 140 may output position information that is collected according to the specific position information collection manner during activation of an application. Also, the display module 140 may display information that is received based on a position. According to certain embodiments, the display module 140 may output map information. Map information output from the display module 140 may include a current position point of the electronic device 100, an area defined through geo-fencing, a movement route, etc. The display module 140 may output a specific screen corresponding to the collected position information. A position based specific screen output by the display module 140 may be switched into any other screen when a position is changed.

The storage module 150 may store an application program and data associated with operations of the electronic device 100. According to certain embodiments, the storage module 150 may include a position information processing program 151 and position information database 153. The position information processing program 151 may include a routine (a command set, a construction or function associated with the command set, a templet, or a class, etc.) for activating a device component according to a specific position information collection manner, when at least one application is activated. The position information processing program 151 may store a program associated with an operation of the GPS module 170. The position information processing program 151 may include at least one of a routine for collecting position information based on the first communication module 111, a routine for collecting position information based on the second communication module 113, and a routine for collecting position information based on a sensor signal and stored map information.

The position information database 153 may store position information, collected by at least one position information collection manner, and map information. Position information stored at the position information database 153 may be provided when a specific application is activated. Information stored at the position information database 153 may be updated as the electronic device 100 moves. Information of a specific point or specific district stored at the position information database 153 may be updated in response to a request of the control module 160.

The position information database 153 may include a communication network type (e.g., cellular, Wi-Fi, etc.), a technology (e.g., 2G, 3G, 4G, etc.), a base station identification (ID), position information and accuracy of a base station, various information (e.g., location area identification (LAI), etc.) of a network 300, etc. The accuracy may include an error range (e.g., 200 m), selectivity (%), etc. The position information database 153 may include worldwide DB, position information of each nation, position information of each district (an administrative district, a latitude/longitude tile, an area designated by radius with a specific point as the center, etc.), and information associated with an specific position. The position information database 153 may be stored at the storage module 150 of the electronic device 100 or may be downloaded from the server device 200. If the position information database 153 is downloaded from the server device 200, the electronic device 100 may determine validity about the position information database 153 when a position is changed. When the position information database 153 is invalid, for example, when a difference between a region of a current position and a region of the position information database 153 is greater than or equal to a predetermined value or the region of the current position and the region of the position information database 153 are different from each other, the electronic device 100 may request new position associated information at the server device 200 and may receive it to update the position information database 153.

According to certain embodiments, when the electronic device 100 moves into another nation, the control module 160 recognizes movement between nations based on a variation in wireless network information and may request position information of each nation at the server device 200 to update the position information database 153. When the electronic device 100 is placed at a boundary of a district where the electronic device 100 exists, the control module 160 may request position associated information of a movable neighboring district at the server device 200 to update the position information database 153. According to certain embodiments, position associated information of each district may be divided into latitude/longitude tiles that are arranged to be partially overlapped at a boundary. When the electronic device 100 enters a portion where two or more tiles are overlapped, the control module 160 may request information of a tile, which the electronic device 100 does not store, at the server device 200 to update the position information database 153. When the electronic device 100 gets out of a portion where tiles are overlapped, the control module 160 may delete information, corresponding to an unnecessary district, from among position associated information previously stored.

According to certain embodiments, as described above, the position information database 153 may store position associated information of a center position of a specific district and a predetermined radius district with the center position as the center. When the electronic device 100 moves, the control module 160 identifies position associated information. If the electronic device 100 is placed at a boundary to which the electronic device 100 belongs, the control module 160 may request, at the server device 200, position associated information of a new center position and a predetermined radius district with the new center position as the center and may update the position information database 153 using the requested position associated information. In this operation, the control module 160 may delete previously stored information according to a predetermined condition. For example, the control module 160 may determine whether to delete information according to various conditions: a point in time when the previously stored information is used, the size of information, a difference between a previous position and a current position, etc.

According to certain embodiments, in the event that the electronic device 100 does not store the position information database 153 or it is impossible to receive position associated information of each area from the server device 200, the control module 160 may request the server device 200 when position information needed to calculate a position is requested and may receive it from the server device 200. Here, the control module 160 may store pieces of information received from the server device 200 at the position information database 153.

The GPS module 170 may be a module for collecting position information. The GPS module 170 may be activated in response to a control of the control module 160 and may collect current position information from a satellite. The GPS module 170 may provide a specific application with the collected position information in response to a control of the control module 160. The GPS module 170 may collect current position information of the electronic device 100 periodically.

The control module 160 may process and transmit a control signal and data associated with an operation of the electronic device 100. The control module 160 may activate a specific application in response to an input signal. The control module 160 may support a specific position information collection manner associated with an application. The control module 160 may activate a device component associated with the specific position information collection manner to collect position information.

Figure 3:
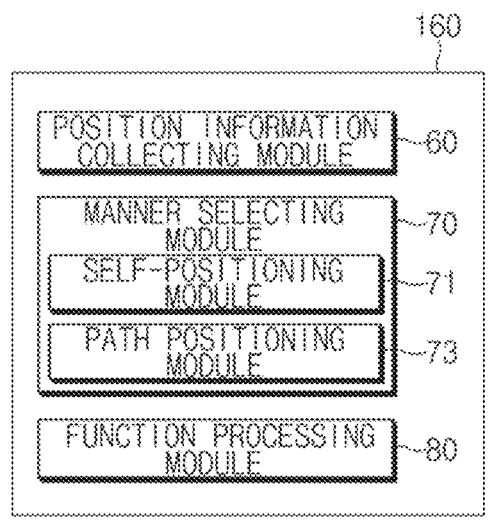
FIG. 3 illustrates a control module according to embodiments of the present disclosure.

FIG. 3 illustrates a control module according to embodiments of the present disclosure.

Referring to FIG. 3, a control module 160 may include a position information collecting module 60, a manner selecting module 70, and a function processing module 80.

The position information collecting module 60 may collect position information in response to at least one of a request of the function processing module 80 and a request of the manner selecting module 70. According to certain embodiments, the position information collecting module 60 may activate a GPS module 170 when receiving a position information collection request from the function processing module 80 according to activation of a navigation function application. The position information collecting module 60 may transmit the received position information to the function processing module 80. According to certain embodiments, based on a request of the manner selecting module 70, the position information collecting module 60 may connect with a server device 200 to collect specific position information. With regard to this, the position information collecting module 60 may connect with the server device 200 using at least one of a first communication module 111 and a second communication module 113. The position information collecting module 60 may receive current position information or position associated information at a specific point from the server device 200. The position information collecting module 60 may provide the received position associated information to at least one of the manner selecting module 70 and the function processing module 80.

The manner selecting module 70 may support to collect position information at least one of position information collection manners that an electronic device 100 can support. At this time, the manner selecting module 70 may control to perform at least one position information collection manner according to accuracy of position information that an application running or execution-requested necessitates. With regard to this, the manner selecting module 70 may contain a self-positioning module 71 and a path positioning module 73.

The self-positioning module 71 may calculate current position information using position information of wireless network base stations of at least one of a first communication module 111 and a second communication module 113 and information that an the electronic device 100 receives or measures. According to certain embodiments, wireless network base stations may include, for example, a cellular base station (eNB, NB, BTS, etc.), a WiBro base station, a Wi-Fi AP, etc. At this time, the self-positioning module 71 may compute accuracy of position information. According to certain embodiments, the self-positioning module 71 may receive information, needed to compute a current position and accuracy of the electronic device 100, from a server device 200 in real time. According to certain embodiments, the self-positioning module 71 may construct position information database 153 with regard to calculating of a position and accuracy. The self-positioning module 71 may determine whether the position information database 153 includes position associated information needed for self-positioning. If the position information database 153 does not include position associated information needed for self-positioning, the self-positioning module 71 may request information associated with self-positioning at the server device 200 and may receive the information associated with self-positioning from the server device 200. The self-positioning module 71 may compute a current position and accuracy of the electronic device 100 using information (e.g., a position of a neighboring base state) associated with self-positioning information (e.g., signals of neighboring base stations, a time difference, a movement speed of an electronic device, etc.) that the electronic device 100 measures and predicts. The self-positioning module 71 may store information from the server device 200 or self-positioned information at the position information database 153 or may delete previously stored information. The self-positioning module 71 may store and manage position associated information, requested by an application running on the electronic device 100 or provided from a specific application, at the position information database 153. According to certain embodiments, when the electronic device 100 acquires position information through positioning, the self-positioning module 71 may store the acquired information at the position information database 153.

The path positioning module 73 may manage a storage state of position associated information when the position associated information is stored at the position information database 153. For example, the path positioning module 73 may store and manage position associated information according to at least one of a time based window manner and a data count based window manner.

In the time based window manner, the path positioning module 73 may generate a window of a specific time size and may store position associated information corresponding to a window size. The path positioning module 73 may shift the window size by lapse of time. According to this feature, the path positioning module 73 may store new position associated information corresponding to the window size by lapse of time.

In the data count based window manner, the path positioning module 73 may generate a window corresponding to a specific data count. The path positioning module 73 may store position associated information corresponding to the generated window size. The path positioning module 73 may shift a window if new position associated information is collected. According to this feature, the path positioning module 73 may maintain the predetermined number of pieces of previous position associated information and may support such that new position associated information continues to be updated.

The path positioning module 73 may store data according to the above-described window manner differently, independently, or synthetically every position information collection manner. For example, the path positioning module 73 may store and manage position associated information, which the GPS module 170 collects, according to the above-described window manner. Also, the path positioning module 73 may store and manage at least one of position associated information received from a server device 200 (CPS: Cellular Positioning System) associated with the first communication module 111, position associated information calculated based on at least one base station providing a communication service to the first communication module 111, position associated information received from the server device 200 (WPS: Wi-Fi Positioning System) associated with the second communication module 113, and position associated information computed based on at least one access point providing a communication service to the second communication module 113, according to a window manner.

The path positioning module 73 may predict current position information and accuracy of a position, based on position associated information, stored and managed on the position information database 153, and information of a sensor sensing movement of the electronic device 100. Sensor information may include at least one of a movement distance of a user, a movement direction, and an altitude. The path positioning module 73 may automatically or selectively operate when stored position associated information is information collected within a predetermined time and it is impossible to operate the GPS module 170, etc. (e.g., in case of a GPS shadow area, when a Wi-Fi AP does not exist, in case of a shadow area of a cellular network, etc.).

According to various embodiments, the manner selecting module 70 may request position information corresponding to setting of a currently running application at the position information collecting module 60 and may control receiving of position information corresponding to an operation of the GPS module 170. According to various embodiments, the manner selecting module 70 may control the communication module 110 to receive position associated information, which a CPS server device provides, and position associated information, which a WPS server device provides. The manner selecting module 70 may provide an application with at least one of the above-described position associated information.

The function processing module 80 may perform a control operation associated with an operation of at least one application. For example, when a specific application requires position information, the function processing module 80 may request at least one of the manner selecting module 70 and the position information collecting module 60 to collect position associated information, based on a specific requirement about position information that the specific application requires.

According to certain embodiments, regarding an operation where the specific application processes position associated information, the function processing module 80 may control to provide a best effort that the electronic device 100 can currently provide. In this operation, the function processing module 80 may control a collection request about position associated information according to a position information collection manner that an application requires, accuracy of position information that the application requires, a position information provision timing that the application requires, etc. Here, the position information collection manner, the accuracy, and the position information provision timing that the application requires may be included in installation information of the application. Alternatively, the function processing module 80 may receive information associated with the position information collection manner, the accuracy, and the position information provision timing, from an application according to execution of an application function.

According to certain embodiments, the function processing module 80 may request at least one of the position information collecting module 60 or the manner selecting module 70 to collect position associated information according to at least one of a collection manner type information, accuracy condition information, and a provision timing set to the application. According to this feature, the control module 160 may use at least one of various collection manners according to a request. For example, the control module 160 may control collecting of position associated information based on the GPS module 170, collecting of position associated information based on the CPS, collecting of position associated information based on the WPS, collecting of position associated information based on the communication module 110, and collecting of position associated information estimated according to stored information and a movement state. The function processing module 80 may provide an application with position associated information including a positioning value, accuracy, reliability, etc. collected through execution of at least one of the above-described information collection manners. Here, the function processing module 80 may determine whether a positioning value collected by a specific collection manner corresponds to a condition designated by an application. If the positioning value collected corresponds to the condition designated by the application, the function processing module 80 may transmit the positioning value to the application. If the positioning value collected does not correspond to the condition designated by the application, the function processing module 80 may control to execute any other collection manner. According to various embodiments, when a specific requirement about position associated information from a specific application does not exist, the control module 160 may select an appropriate position information collection manner according to a currently used position information collection manner and a state of the electronic device 100.

According to various embodiments, the function processing module 80 may collect best position associated information according to a state of the electronic device 100 and may transmit it to a relevant application. For example, in case of a communication environment where it is impossible to use the GPS module 170, the function processing module 80 may collect position associated information in the WPS based position information collection manner or the CPS based position information collection manner and may transmit the collected information to a running application. Alternatively, in case of an environment where it is impossible to use the GPS module 170, the WPS, and the CPS, the function processing module 80 may collect at least one of position associated information using the self-positioning module 71 and position associated information using the path positioning module 73 and may transmit it to a running application.

According to various embodiments, when not providing position information satisfying a specific requirement about position information that a specific application requires, the function processing module 80 may collect best position associated information using a currently used position information collection manner and may provide a relevant application with the collected position information and a level of the collected position information.

According to various embodiments, the function processing module 80 may support a specific position information collecting mode by combining at least one position information collection manners based on information set to an application. For example, the function processing module 80 may support a high accuracy mode and a low power mode.

Regarding supporting of the high accuracy mode, the function processing module 80 may determine whether collecting of position associated information is possible in an order of a positioning manner with high accuracy. According to certain embodiments, the function processing module 80 may identify a manner capable of currently performing positioning in an order of a position information collection manner based on the GPS module 170, a position information collection manner based on the WPS, a position information collection manner based on self-positioning, etc. and may control to execute the manner capable of currently performing positioning. For example, when the GPS module 170 is usable, the function processing module 80 may first localize the GPS module 170. When the GPS module 170 remains in a turn-off state or the electronic device 100 is disposed in a GPS shadow area, the function processing module 80 may control to collect position information in the WPS based position information collection manner or position information to be computed based on the second communication module 113. Also, when the second communication module 113 remains at a turn-off state, an AP supporting the second communication module 113 does not exist, or connection is impossible, the function processing module 80 may control to compute position information based on the first communication module 111 or to position in the CPS based position information collection manner. An order of a positioning manner with high accuracy may be changed according to stored information, a situation of the electronic device 100, a situation of the server device 200, and a situation of the network 300.

Regarding supporting of the low power mode, the function processing module 80 may determine whether it is possible to collect position associated information in an order of a positioning manner with low power consumption. When position associated information provided from a specific application is applicable to any other application running, the function processing module 80 may provide previously positioned position associated information to the any other application without new positioning. If position associated information measured according to driving of other application does not exist, the function processing module 80 may collect position associated information using at least one of a self-positioning manner of the self-positioning module 71 and a path positioning manner of the path positioning module 73. The function processing module 80 may provide an application with position associated information calculated in a manner satisfying a specific requirement of a relevant application. In this operation, if pieces of position associated information collected through the self-positioning manner and the path positioning manner satisfy a specific requirement of an application, the function processing module 80 may provide an application with position associated information calculated using a position information collection manner with higher accuracy.

According to certain embodiments, when the self-positioning manner is unusable, the function processing module 80 may control to collect position associated information in the path positioning manner. According to various embodiments, the function processing module 80 may control to first apply the low power mode to an application where a specific mode is not set. When position associated information collected using the low power mode does not satisfy a specific requirement of an application, the function processing module 80 may control to execute a position information collection manner with high accuracy.

According to various embodiments, the electronic device 100 may include the control module 160 that controls to identify a position information collection manner set to an application running or execution-requested and to collect position information in a manner corresponding to the identified position information collection manner; and a display module 140 configured to output the collected position information on an execution screen of an application.

According to various embodiments, the electronic device 100 may include at least one of the GPS module 170 for collecting the position information, at least one of a Wi-Fi communication module for receiving position information from the server device 200 and a cellular communication module, a cellular communication module for collecting cell information associated with calculating of position information, and a Wi-Fi communication module for collecting access point information associated with calculating of position information.

According to various embodiments, the electronic device 100 may further include a sensor module for providing sensor information according to movement and a storage module 150 for storing position associated information including map information and position information. The control module 160 may estimate position information based on the stored position associated information and movement information according to sensor information.

According to various embodiments, the control module 160 may perform self-positioning using at least one communication module 110 and may determine whether accuracy of acquired position information corresponds to a setting condition of the application. The control module 160 may provide the position information to the application when the accuracy of the acquired position information corresponds to the setting condition of the application.

According to various embodiments, when the accuracy of the acquired position information does not correspond to the setting condition of the application, the control module 160 may compare accuracy of new position information acquired using another position information collection manner with the setting condition of the application. When the accuracy of the new position information corresponds to the setting condition of the application, the control module 160 may provide the new position information to the application.

According to various embodiments, when the accuracy of the acquired position information does not correspond to the setting condition of the application, the control module 160 may compare accuracy of new position information acquired using another position information collection manner with the setting condition of the application. When the accuracy of the new position information does not correspond to the setting condition of the application, the control module 160 may provide one, having relatively high accuracy, from among the position information and the new position information to the application.

According to various embodiments, when the electronic device 100 enters a specific area, the control module 160 may control to collect position information in a designated specific position information collection manner. Before the electronic device 100 enters the specific area, the control module 160 may control to collect position information in a position information collection manner that is used for a relatively low power. When the electronic device 100 gets out of the specific area, the control module 160 may control to collect position information in another position information collection manner.

According to various embodiments, when the electronic device 100 enters a specific area, the control module 160 may control to collect position information in a position information collection manner with relatively high accuracy.

Figure 4:
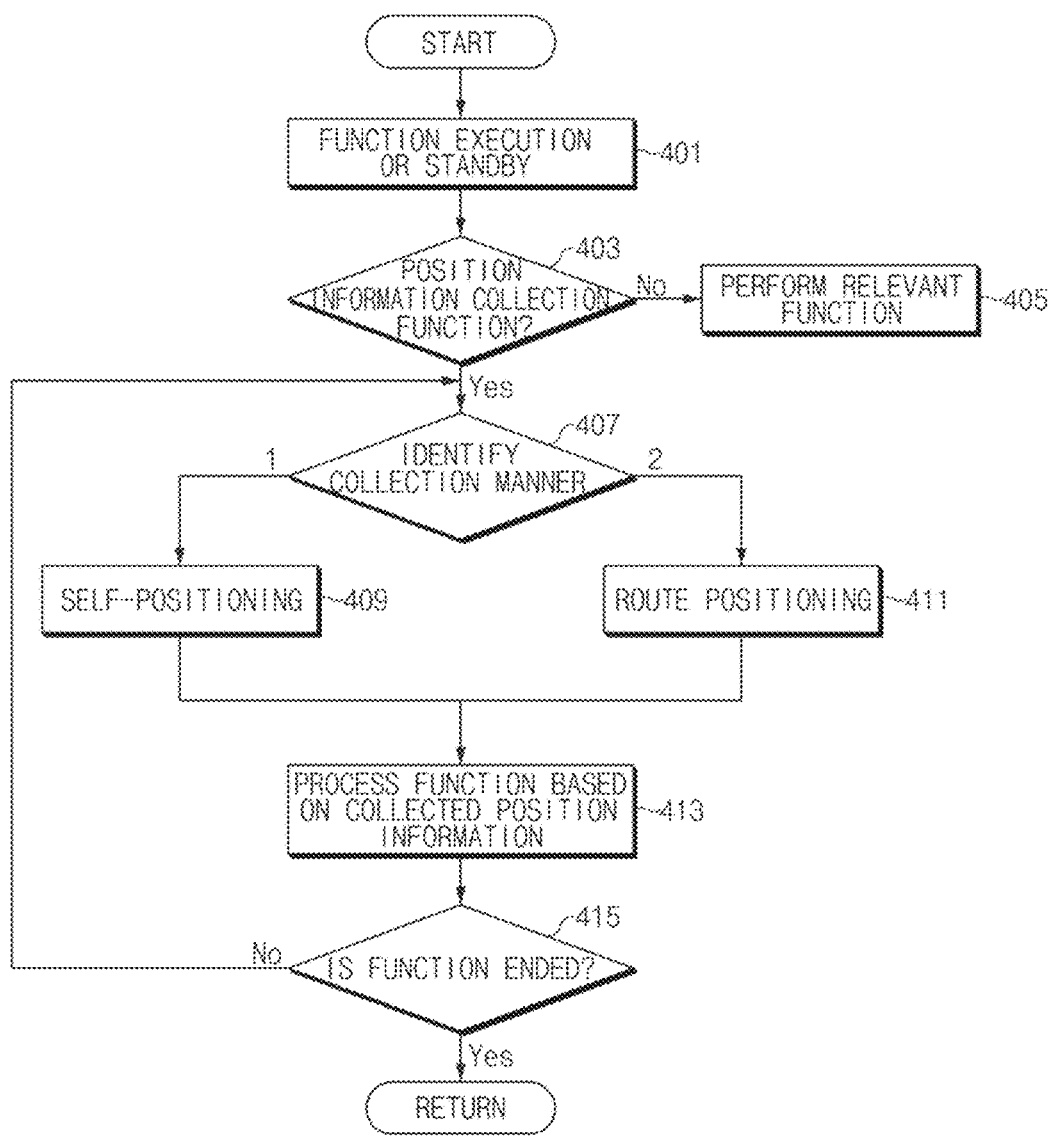
FIG. 4 illustrates an operating method of an electronic device according to embodiments of the present disclosure.

FIG. 4 illustrates an operating method of an electronic device according to embodiments of the present disclosure.

Referring to FIG. 4, in operation 401, a control module 160 may perform a function or may wait. For example, the control module 160 may output a standby screen or a specific menu screen.

In operation 403, the control module 160 may determine whether to perform a position information collection function. For example, the control module 160 may determine whether to activate an application necessitating position information. Alternatively, the control module 160 may determine whether an event associated with collecting of position information is generated. Alternatively, the control module 160 may determine whether an event associated with collecting of position information is generated, according to a scheduled event. When the event associated with collecting of position information is not generated, the method proceeds to operation 405, in which a relevant function associated with the generated event is performed under a control of the control module 160. Alternatively, the control module 160 may control to maintain a function previously performed.

When the event associated with collecting of position information is generated, the method proceeds to operation 407, in which the control module 160 identifies a position information collection manner. The control module 160 may identify a specific requirement of a position associated information, which an application requires, and a currently usable position information collection manner and may select a position information collection manner. For example, an order of a position information collection manner to be used may be decided according to accuracy of position information required, an operating mode, etc. When a first position information collection manner is selected in operation 407, the method proceeds to operation 409, in which the control module 160 performs self-positioning. When a second position information collection manner is selected in operation 407, the method proceeds to operation 411, in which the control module 160 performs path positioning. With regard to this, the control module 160 may identify setting information of an application needed to process position information. Alternatively, the control module 160 may identify setting information of a specific function needed to process position information.

In operation 413, the control module 160 may perform a function based on the collected position information. For example, the control module 160 may transmit the collected position information to a relevant application. The application may perform outputting of display information corresponding to the transmitted position information, collecting and outputting of information associated with position information, outputting of an alarm corresponding to position information, changing of a screen corresponding to position information, etc. In operation 415, when position information collected does not accord with the specific requirement and other usable collection method exists, the method proceeds to operation 407, in which the control module 160 performs an additional operation without transmitting relevant information to a relevant application.

In operation 415, the control module 160 may determine whether an event associated with a function end is generated. If no event associated with the function end is generated, the method proceeds to operation 407, in which the control module 160 again performs the above-described operations 407 to 413. If the event associated with the function end is generated, the method returns to operation 401.

When position information collected does not accord with the specific requirement and other usable collection method exists, in operation 415, the method proceeds to operation 407, in which the control module 160 collects position information using other collection methods.

According to various embodiments, a position information collection manner of at least one of operations 409 and 411 may include at least one of a position information collection manner based on a GPS module 170, a position information collection manner based on WPS, a position information collection manner based on CPS, a position information collection manner based on a second communication module 113, and a position information collection manner based on a first communication module 111. For example, the control module 160 may identify setting information of an application in operation 407 and may control to perform a specific position information collection manner corresponding to the setting information in operation 409 or operation 411.

Figure 5:
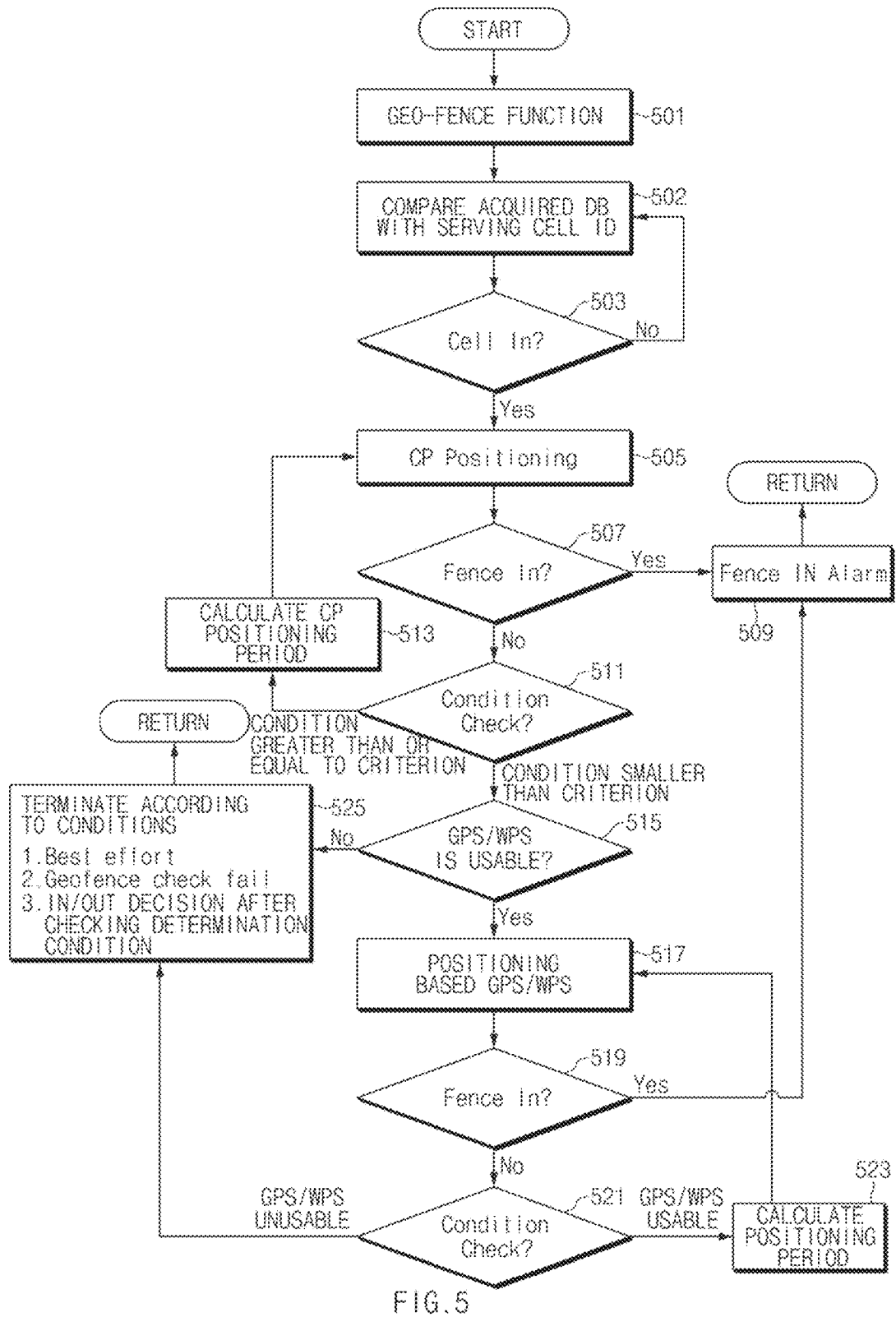
FIG. 5 illustrates a position based information providing method of an electronic device according to embodiments of the present disclosure.

FIG. 5 illustrates a position based information providing method of an electronic device according to embodiments of the present disclosure.

Referring to FIG. 5, a control module 160 may support a position based information providing function. For example, the control module 160 may perform a Geo-Fence function in operation 501. With regard to this feature, in operation 502, the control module 160 may compare database corresponding to acquired position associated information with a serving cell ID. Regarding identifying of the serving cell ID, the control module 160 may control to have a state where an electronic device 100 uses a first communication module 111 and is camped on a specific cell (a state where the electronic device 100 is connected with a base station to provide a communication service through the first communication module 111).

The control module 160, in operation 503, may compare a current cell ID with a cell ID included in the acquired position associated information to determine whether an electronic device 100 is placed within a specific cell area. When the electronic device 100 is not placed within the specific cell area, operation 502 is iteratively performed under the control of the control module 160. The control module 160 may perform operation 502 periodically or in real time while the Geo-Fence function is executed.

In operation 503, when the electronic device 100 is determined as being placed within the specific cell, the control module 160, in operation 505, may perform CP positioning. For example, the control module 160 may calculate a current position using a cellular communication module. In operation 507, the control module 160 may determine whether the electronic device 100 is disposed in a specific fence. When the electronic device 100 is determined as being disposed in the specific fence, in operation 509, the control module 160 may output an alarm indicating that the electronic device 100 enters the specific fence. Afterwards, the control module 160 may control to active applications designated to be performed automatically in the specific fence.

When the electronic device 100 is determined as being not disposed in the specific fence, in operation 511, the control module 160 may identify a condition. If accuracy of a position value currently computed by the CP positioning is greater than or equal to a criterion, in operation 513, the control module 160 may compute a CP positioning period. If the CP positioning period arrives, the method proceeds to operation 505 to perform operations 505, 507, and 511 again.

If the accuracy of the calculated position value is smaller than the criterion, in operation 515, the control module 160 may determine whether at least one of a position information collection manner based on GPS module 170 and a position information collection manner based on a WPS is usable. If at least one of the GPS module based position information collection manner and the WPS based position information collection manner is usable, in operation 517, the control module 160 may perform positioning according to at least one of the GPS module based position information collection manner and the WPS based position information collection manner. In operation 519, the control module 160 may determine whether a current position of the electronic device 100 is in the specific fence. Here, when the current position of the electronic device 100 is in the specific fence, the method proceeds to operation 509. In contrast, when the current position of the electronic device 100 does not exist in the specific fence, the method proceeds to operation 521, in which the control module 160 identifies a condition. Here, when GPS module based position information collection and WPS based position information collection are possible, the method proceeds to operation 523, the control module 160 may calculate a positioning period. When the positioning period arrives, the method proceeds to operation 517 to perform operations 519 and 521. When GPS module based position information collection and WPS based position information collection are impossible, for example, when the GPS module 170 is turned off, the electronic device 100 enters a GPS shadow area, or connection with a server device 200 associated with WPS is impossible, the method proceeds to operation 525. According to certain embodiments, when GPS/WPS is determined, in operation 515, as being unusable, the method proceeds to operation 525.

In operation 525, the control module 160 may terminate the method according to a condition or may perform best effort submission, Geo-Fence check fail, and in/output decision after checking a determination condition. After operation 525, the control module 160 returns to a specific function of the electronic device 100. For example, the control module 160 may control to output a standby screen of the electronic device 100 or to maintain a function carried out before execution of the Geo-Fence function.

Figure 6:
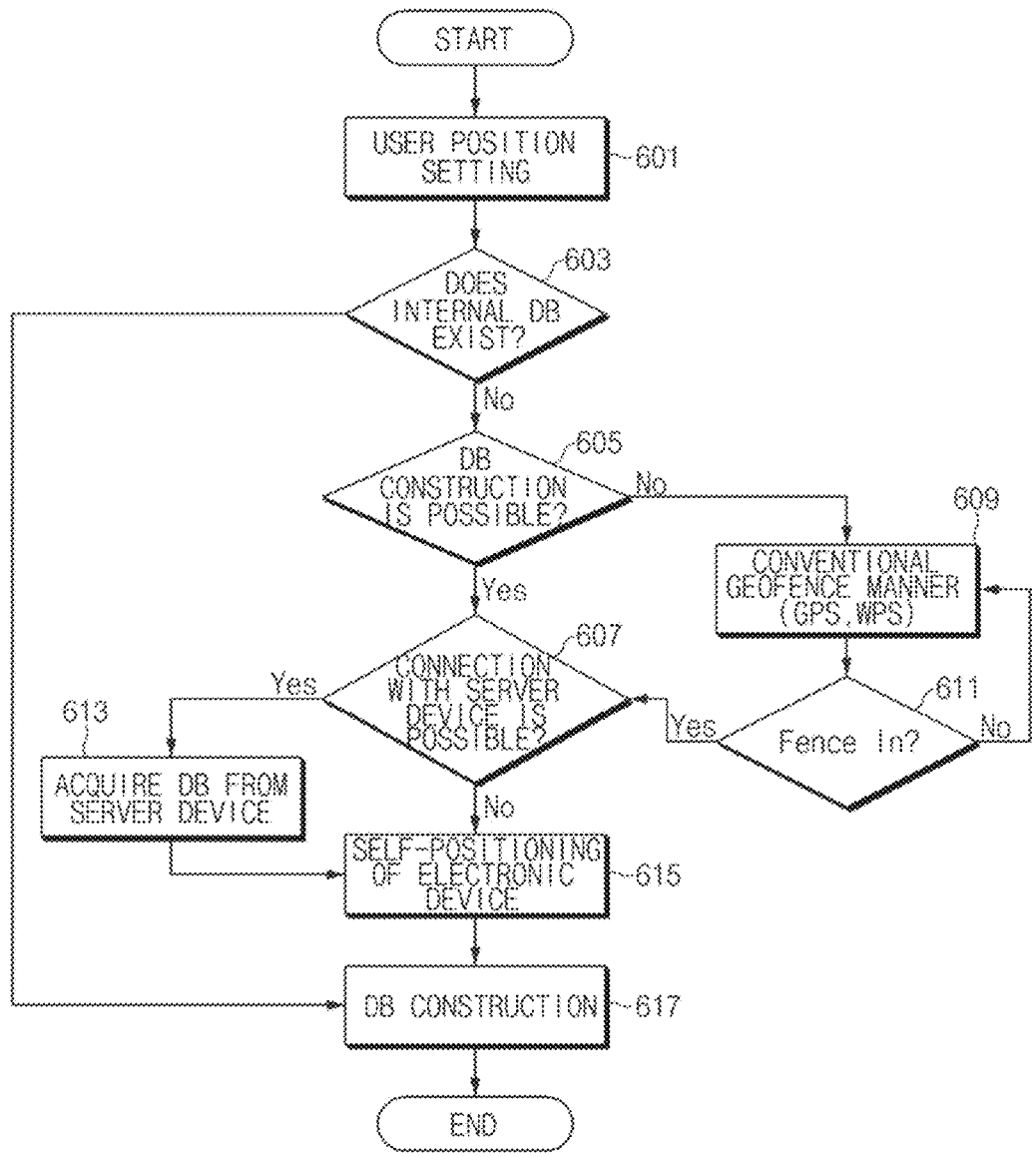
FIG. 6 illustrates a position information database constructing method of an electronic device according to embodiments of the present disclosure.

FIG. 6 illustrates a position information database constructing method of an electronic device according to embodiments of the present disclosure.

Referring to FIG. 6, in operation 601, a control module 160 may set a user position to be applied to Geo-Fence in response to a user input. For example, the control module 160 may set the user position to a current position of an electronic device 100. Alternatively, the control module 160 may set the user position to a specific point designated by an input signal. With regard to this feature, the control module 160 may support to provide map information to select a specific point. According to certain embodiments, the control module 160 may receive address information to set the user position.

In operation 603, the control module 160 may determine whether position associated information corresponding to the user position exists in position information database 153. When the position associated information does not exist, the method proceeds to operation 605, in which the control module 160 determines whether it is possible to construct a database. For example, the control module 160 may determine whether it is possible to connect with a base station of a neighboring cell using a communication module 110. In the event that it is possible to construct a database, in operation 607, the control module 160 may determine whether it is possible to connect with a server device 200.

When it is impossible to construct a database, in operation 609, the control module 160 may collect a database according to another Geo-Fence manner using a GPS module 170 and a Wi-Fi Positioning System (WPS). In operation 611, the control module 160 may determine whether the electronic device 100 exists in a specific fence. As a consequence of determining that the electronic device 100 does not exist in the specific fence, the method proceeds to operation 609 to perform a relevant operation again. As a consequence of determining that the electronic device exists in the specific fence, the method proceeds to operation 607, in which the control module 160 determines whether it is possible to connect with the server device 200. When it is possible to connect with the server device 200, in operation 613, the control module 160 may acquire database from the server device 200. In operation 615, the control module 160 may perform self-positioning. In this operation, the control module 160 may use information of serving and neighbor cells, information of quality of an input signal, etc. In operation 617, the control module 160 may construct database based on pieces of position information thus measured.

Figure 7:
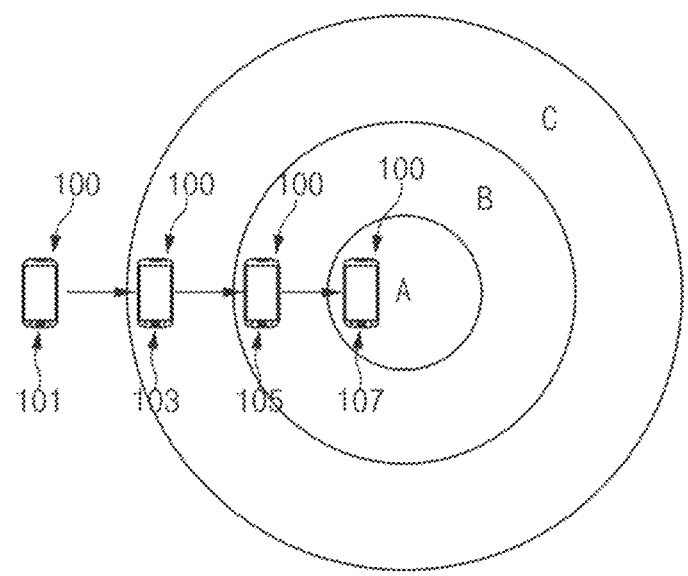
FIG. 7 illustrates a diagram for describing a position based information providing method of an electronic device according to embodiments of the present disclosure.

FIG. 7 illustrates diagram for describing a position based information providing method of an electronic device according to embodiments of the present disclosure.

Referring to FIG. 7, in the event that a remote position is designated as a user position of Geo-Fence, an electronic device 100 may provide a service associated with movement. In this operation, a control module 160 of the electronic device 100 may select position associated information about the remote position stored at position information database 153 to process a function. According to certain embodiments, if information associated with the remote position does not exist, the control module 160 may request and receive a database of a specific condition at a server device 200 (e.g., a positioning server) that provides position associated information. According to certain embodiments, when it is impossible to receive a database, the control module 160 may use a specific manner (e.g., a GPS module, a WPS, etc.) until the electronic device 100 first enters a specific position (e.g., Geo-Fence). If entering a first specific fence, the control module 160 may measure information of a neighboring cell(s) using a communication module 110 and may use it as database.

Position associated information stored at the position information database 153 or position associated information received from the server device 200 may be at least one of sets of APs or cells sufficiently including a specific Geo-Fence area. The control module 160 of the electronic device 100 may provide the server device 200 with specific requirements such as center position information, radius information, a data count including at least one of a cell and an AP required, an operator, a technology type (e.g., 2G, 3G, 4G, etc.), etc. The server device 200 may provide the electronic device 100 with position associated information corresponding to a specific requirement of the electronic device 100. For example, the server device 200 may search for a cell or an AP belonging to a relevant area using required area and data count. When the number of cells or APs found is smaller than a required count, the server device 200 may add data in a manner where there is first added data of one, closer to the center position, from among cells or APs not belonging to a relevant area. If it is impossible to identify the center position exactly (e.g., when GPS is turned off or when positioning is impossible due to a shadow area), the electronic device 100 may provide the server device 200 with information of a surrounding Wi-Fi AP or cellular base station measured by the electronic device 100 and quality information of a signal that the electronic device 100 receives. The server device 200 may extract position associated information by estimating a position of the electronic device 100 based on information that the electronic device 100 provides, and may provide relevant information to the electronic device 100.

The electronic device 100 may define a Geo-Fence area A with a user-specific area as the center. The electronic device 100 may previously collect and store cell information about the surroundings of the Geo-Fence area A. An area C may mean an area that a control module determines as a cell-in state based on cells measured at the Geo-Fence area A or defined as neighboring cells. For example, an area C may be an area that is determined as a neighboring cell area of the Geo-Fence area A that the electronic device 100 enters. When the electronic device 100 enters the area C, a position of the electronic device 100 may be estimated through CP positioning.

An area B may be an area where a position estimation manner with higher accuracy (e.g., GPS or WPS, etc.) is used when accuracy of position information provided through the CP positioning is insufficient to detect the area A. In general, since a cell size is larger than a geo-fence size, the size of the area C may be larger than that of the area A. However, if a cell radius is set to be relatively small at a specific district, such as a congested downtown area, etc., the size of the area C may be similar to or smaller than that of the area A. Similarly, the size of the area B may be similar to or smaller than that of the area A. Under this condition, the electronic device 100 may determine "geo-fence in" only in the CP positioning manner after cell-in determination. When cell information is changed due to movement or a given period arrives, the electronic device 100 may compare the changed cell information with stored cell information associated with the Geo-Fence area A.

According to certain embodiments, the electronic device 100 may perform operation 502 when the comparison result indicates that the electronic device 100 does not enter a cell-in area C (a first state 101). As moving, the electronic device 100 may enter the area C (a second state 103). At this time, the electronic device 100 may perform operation 505. If entering the area C, the electronic device 100 may execute a first function automatically. For example, if entering a first Geo-Fence area C, the electronic device 100 may control to output a standby screen where designated specific icons are arranged. As moving, the electronic device 100 may enter the area B (a third state 105). At this time, the electronic device 100 may perform operation 517. If entering the area B, the electronic device 100 may execute a second function automatically. For example, when entering the area B, the electronic device 100 may control to execute an audio source playing function automatically. As moving, the electronic device 100 may enter the Geo-Fence area A (a fourth state 107). If entering the Geo-Fence area A, the electronic device 100 may perform a third function, for example, may issue an alarm notifying a user of fence-in. The above-described first to third functions may be changed to various functions that a user selects.

If entering the areas A, B, and C, the electronic device 100 may determine whether to get out of each area or whether to move to other area periodically or in real time. According to certain embodiments, when entering the area C, the electronic device 100 may compute a position based on a self-positioning manner. A period where the self-positioning manner is used may be variable according to a distance between a measured position and a fence, a movement speed of a user measured using a sensor, etc.

When accuracy of the self-positioning manner does not satisfy a given value, the electronic device 100 may control to automatically use a position information collection manner based on a GPS module 170 or a position information collection manner based on a WPS. The electronic device 100 may measure its own position using the GPS module 170 or the WPS and may identify a fence-in condition. At the same time, the electronic device 100 may identify a cell-out condition. If remaining at a fence-in state, the electronic device 100 may identify a fence-out state using the GPS module 170 or the WPS after alarming the fence-in. In the event that a position of the electronic device 100 is spaced from the fence over a specific distance, a transition of the electronic device 100 to a cell-in state may be determined using the GPS module 170 or the WPS. Afterwards, the electronic device 100 may compare a cell ID acquired at a current position and a cell ID acquired at a previous position, to identify a cell-out state. If transitioning to a cell-out state due to movement, the electronic device 100 may process a function corresponding to the cell-out state.

When the GPS module 170 or the WPS is unusable, the electronic device 100 may provide best effort (determining "fence in/out" only using a self-positioning result). The electronic device 100 may regard the event that accuracy of the self-positioning result does not satisfy a specific condition, as fail. The electronic device 100 may perform at least one of a best effort providing operation or a fail processing operation.

As described above, the electronic device 100 may selectively use various position information collection manners, thereby reducing current consumed at an operation of the electronic device 100 associated with position information and making it possible to calculate a user position even at a situation where the GPS module enters a shadow area or technologies such as a WPS, a CPS, etc. are unusable. Also, the electronic device 100 may support to reduce current consumed to detect fence-in when the Geo-Fence function is used and to perform efficient fence in or out.

According to various embodiments, a position associated information providing method may include identifying a position information collection manner set to an application running or execution-requested, collecting position information in a manner (or specific techniques, or a specific methods) corresponding to the identified position information collection manner, and providing the collected position information to the application. According to various embodiments, the collecting position information in a manner may include selecting one collection manner of a plurality of position information collection manners (for example: a self-positioning manner, and a route positioning manner, GPS, WPS, CP-Positioning etc.)

According to various embodiments, the collecting of position information may include at least one of collecting position information using a GPS module 170, receiving position information from a server device associated with a Wi-Fi communication module, receiving position information from a server device associated with a cellular communication module, calculating position information using the Wi-Fi communication module, calculating position information using the cellular communication module, and estimating position information based on previously stored position information and movement information according to sensor information.

According to various embodiments, the collecting of position information may include performing self-positioning using a communication module 110 and determining whether accuracy of position information computed through the self-positioning corresponds to a setting condition of the application.

According to various embodiments, the providing may include providing the application with the position information when the accuracy of the position information corresponds to the setting condition of the application.

According to various embodiments, the collecting of position information may contain comparing accuracy of new position information acquired using another position information collection manner with the setting condition of the application when the accuracy of the position information does not correspond to the setting condition of the application and providing the new position information to the application when the accuracy of the position information corresponds to the setting condition of the application.

According to various embodiments, the collecting of position information may contain comparing accuracy of new position information acquired using another position information collection manner with the setting condition of the application when the accuracy of the position information does not correspond to the setting condition of the application and providing one, having relatively high accuracy, from among the position information and the new position information to the application when the accuracy of the new position information does not correspond to the setting condition of the application.

According to various embodiments, the collecting of position information may contain collecting position information in a designated specific position information collection manner when the electronic device 100 enters a specific area.

According to various embodiments, the collecting of position information may contain collecting position information in a position information collection manner used for a relatively low power before the electronic device 100 enters the specific area.

According to various embodiments, the collecting of position information may further include collecting position information in another position information collection manner when the electronic device 100 gets out of the specific area.

According to various embodiments, the collecting of position information may further include collecting position information in a position information collection manner with relatively high accuracy when the electronic device 100 enters a specific area.

Figure 8:
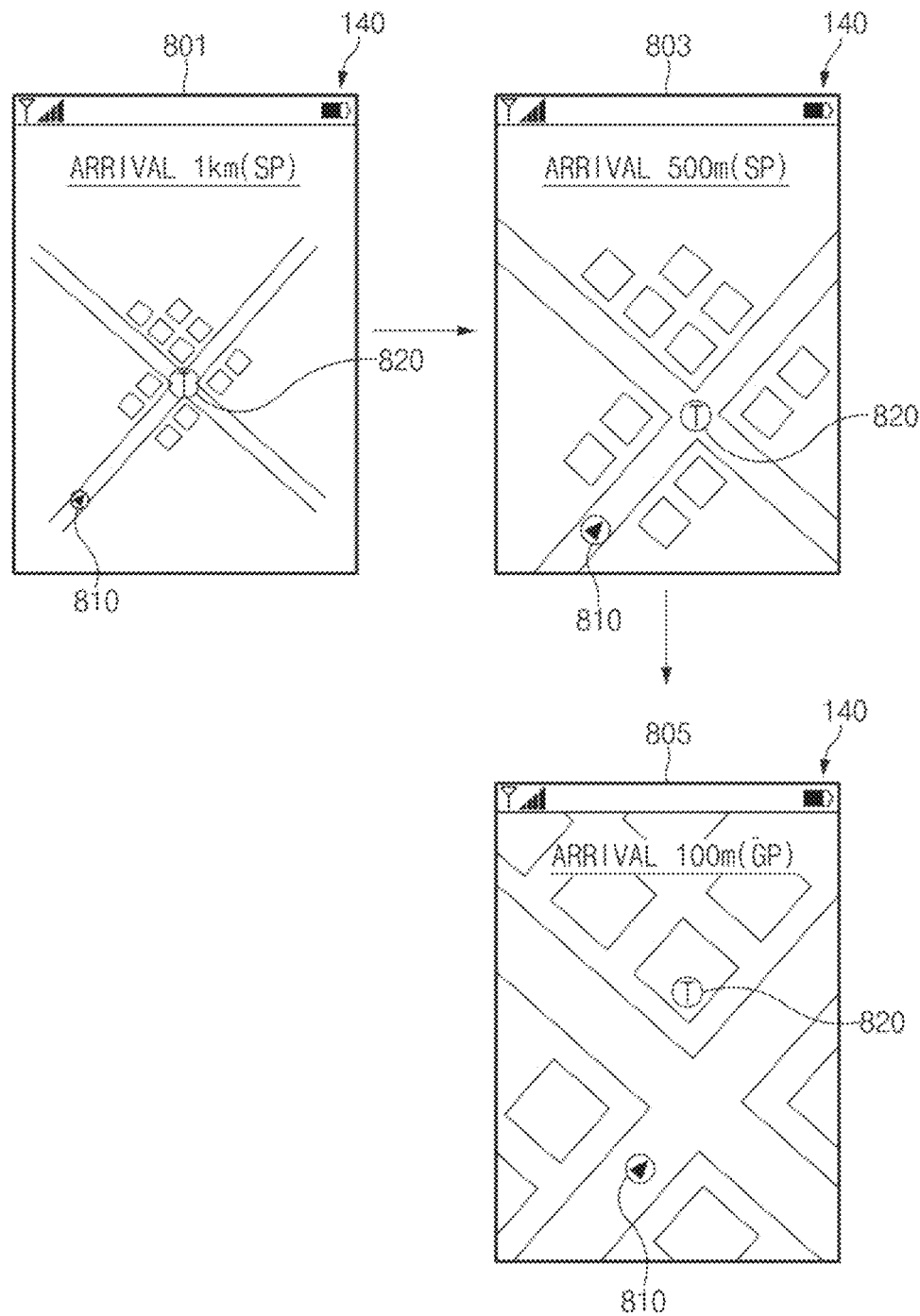
FIG. 8 illustrates a screen interface of an electronic device according to embodiments of the present disclosure.

FIG. 8 illustrates screen interfaces of an electronic device according to embodiments of the present disclosure.

Referring to FIG. 8, a display module 140 of an electronic device 100 may output a map information screen 801 according to execution of a path fining function. Regarding the path fining function, a control module 160 may receive an input about a target point 820 to be found. With regard to this, the control module 160 may control to output map information for selecting the target point 820 on the display module 140 or to output an input screen for inputting an address of a specific point, a building name, etc. When the target point 820 is selected, the control module 160 may collect current position information 810 of the electronic device 100. In this operation, the control module 160 may collect the current position information 810 using at least one of a position information collection manner based on a GPS module 170, a position information collection manner based on a CPS, a self-positioning manner, and a route positioning manner. According to certain embodiments, the control module 160 may compute current position information 810 based on a self-positioning manner where the relatively small amount of current is consumed. For example, the control module 160 may perform positioning using a base station cell. According to this feature, the display module 140 may output the current position information 810 computed and the target point 820 onto map information. As moving, the electronic device 100 may gradually become closer to the target point 820. The control module 160 may compute the current position information 810 based on the self-positioning manner until the electronic device 100 is placed within a constant distance, for example, a first distance up to the target point 820.

According to certain embodiments, when a distance between a current position of the electronic device 100 and the target point 820 is within the first distance, the display module 140 may output a specific screen 803 corresponding to the first distance. For example, when a distance between a current position of the electronic device 100 and the target point 820 is within the first distance, the display module 140 may magnify and output map information by a constant ratio (e.g., a first ratio) automatically. Regarding using position information more exactly, the control module 160 may use a WPS based position information collection manner. The control module 160 may compute the current position information 810 based on the WPS based position information collection manner until the electronic device 100 is placed within a constant distance, for example, a second distance shorter than the first distance up to the target point 820.

According to certain embodiments, when a distance between the current position of the electronic device 100 and the target point 820 is within the second distance, the display module 140 may output a specific screen 805 corresponding to the second distance. For example, when a distance between the current position of the electronic device 100 and the target point 820 is within the second distance, the display module 140 may magnify and output map information by a constant ratio (e.g., a second ratio greater than the first ratio) automatically. Regarding using position information more exactly, the control module 160 may use a GPS module 170 based position information collection manner.

Figure 9:
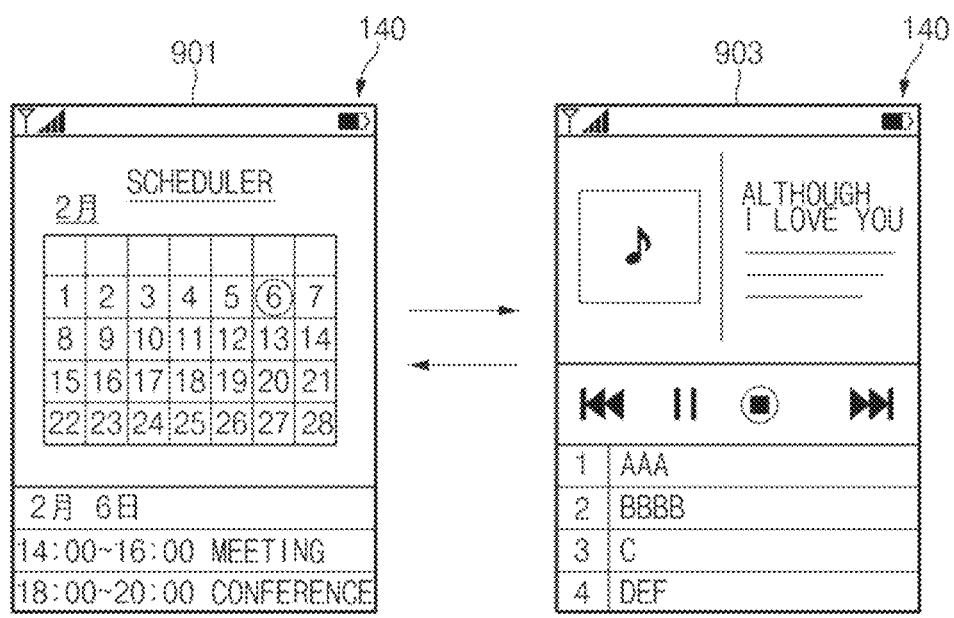
FIG. 9 illustrates a screen interface of an electronic device according to embodiments of the present disclosure.

FIG. 9 illustrates screen interfaces of an electronic device according to another embodiment of the present disclosure.

Referring to FIG. 9, when an electronic device 100 is placed at a first position, a display module 140 may output a scheduling screen 901. With regard to this, a control module 160 may collect current position information using at least one of a position information collection manner based on a GPS module 170, a position information collection manner based on a CPS, a self-positioning manner, and a route positioning manner. According to certain embodiments, the control module 160 may compute the current position information based on a self-positioning manner. When the current position information calculated is included in a specific first area, the control module 160 may control to output the scheduling screen 901.

According to certain embodiments, as the electronic device 100 moves, its position may be changed. The control module 160 may collect position information according to movement of the electronic device 100 periodically or in real time. When the electronic device 100 is placed at a specific position, for example, in a second area, the control module 160 may control to execute an audio source play function. The display module 140 may output an audio source play screen 903 as the audio source play function is executed. According to various embodiments, if the electronic device 100 moves from the second area to a first area, the display module 140 may output the scheduling screen 901.

Regarding supporting the above-described function, the control module 160 may provide an icon or menu item associated with an automatic screen change function according to an area. Also, the control module 160 may provide a setting function for selecting a function automatically executed when performing the automatic screen change function. In response to an execution request about the automatic screen change function, the control module 160 may collect current position information of the electronic device 100. If the collection position is included in a specific position, the control module 160 may control to execute a specific function automatically and to output a screen corresponding to the function as an execution result.

Figure 10:
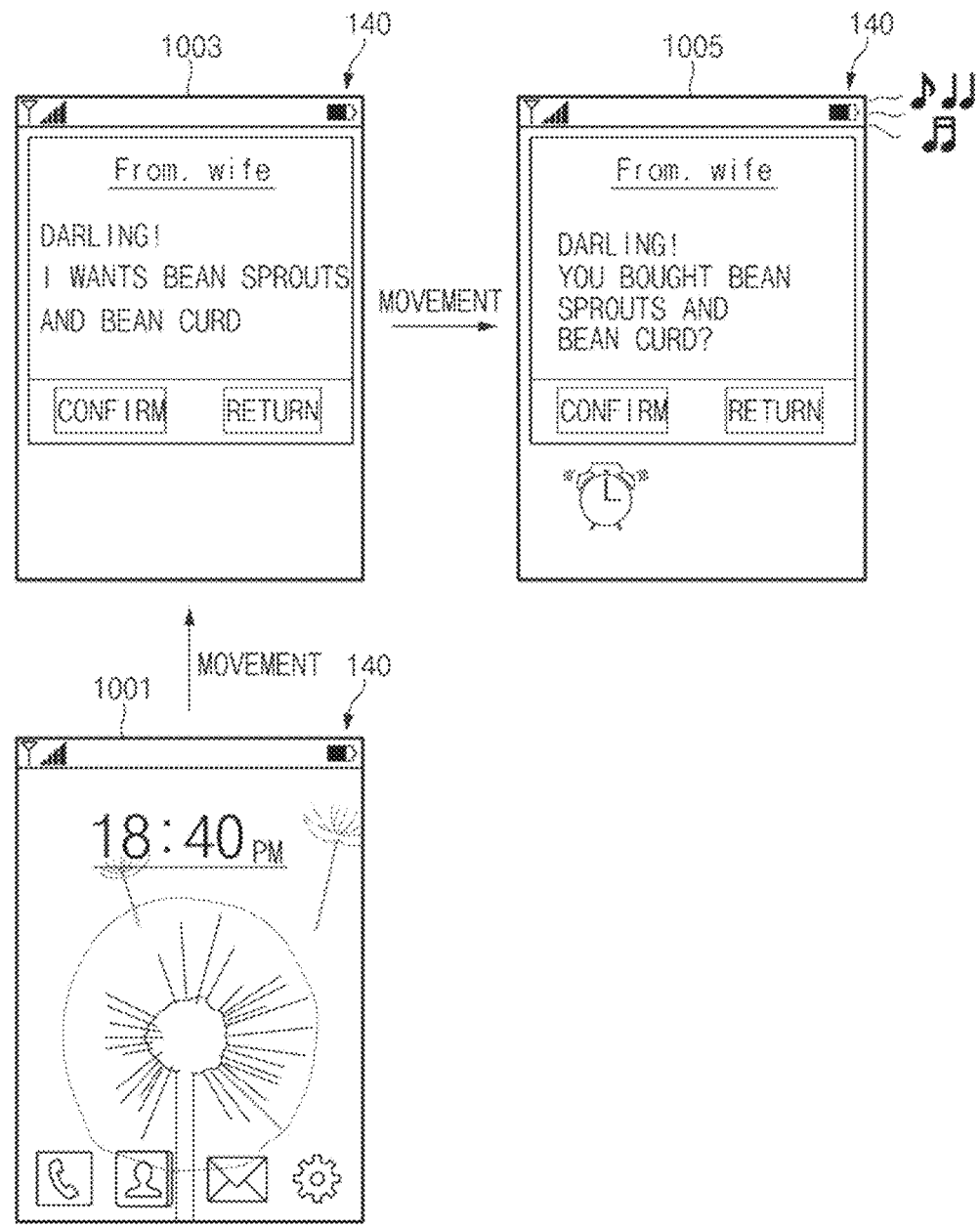
FIG. 10 illustrates screen interfaces of an electronic device according to embodiments of the present disclosure.

FIG. 10 illustrates a screen interface of an electronic device according to another embodiment of the present disclosure.

Referring to FIG. 10, a display module 140 may output a standby screen 1001 according to an operating state of an electronic device 100. For example, when the electronic device 100 is placed at a position included in a specific first area, a control module 160 may control to output a standby screen on the display module 140. In this operation, the control module 160 may calculate a low-power mode based position. For example, the control module 160 may compute a position of the electronic device 100 according to a self-positioning manner. Alternatively, the control module

160 may control to calculate a position of the electronic device 100 according to a path positioning manner.

As moving, the electronic device 100 may be placed at a position included in a specific area, for example, a second area. The control module 160 may transmit relevant position information to other electronic device when the electronic device 100 is placed at the second area. The control module 160 may receive a specific message, for example, a first message from the other electronic device. The display module 140 may output the first message on a screen 1003. The display module 140 may output a virtual confirmation button associated with confirming the first message. Also, the display module 140 may output a virtual return button for transmitting a response to confirmation of the first message to the other electronic device. When an input is received through the virtual return button, the control module 160 may transmit an alarm about confirmation of the first message to the other electronic device automatically.

As moving, the electronic device 100 may be placed at a position included in a third area different from a second area. The control module 160 may transmit relevant position information to the other electronic device when the electronic device 100 is placed at the third area. The control module 160 may receive a specific message, for example, a second message from the other electronic device. The display module 140 may output the second message on a screen 1005. The display module 140 may output a virtual confirmation button associated with confirming the second message. Also, the display module 140 may output a virtual return button for transmitting a response to confirmation of the second message to the other electronic device. When an input is received through the virtual return button, the control module 160 may transmit an alarm about confirmation of the second message to the other electronic device automatically. As regard confirming the second message, the control module 160 may further perform at least one of the following operations: specific audio data output and specific vibration pattern output.

According to various embodiments, the other electronic device 100 may previously store a message to be sent according to a position of the electronic device 100. For example, the other electronic device 100 may previously store the first message and the second message. The other electronic device 100 may automatically transmit the first message to the electronic device 100 if receiving a message, indicating that the electronic device 100 enters the first area, from the electronic device 100. The other electronic device 100 may automatically transmit the second message to the electronic device 100 if receiving a message, indicating that the electronic device 100 enters the second area, from the electronic device 100.

Figure 11:
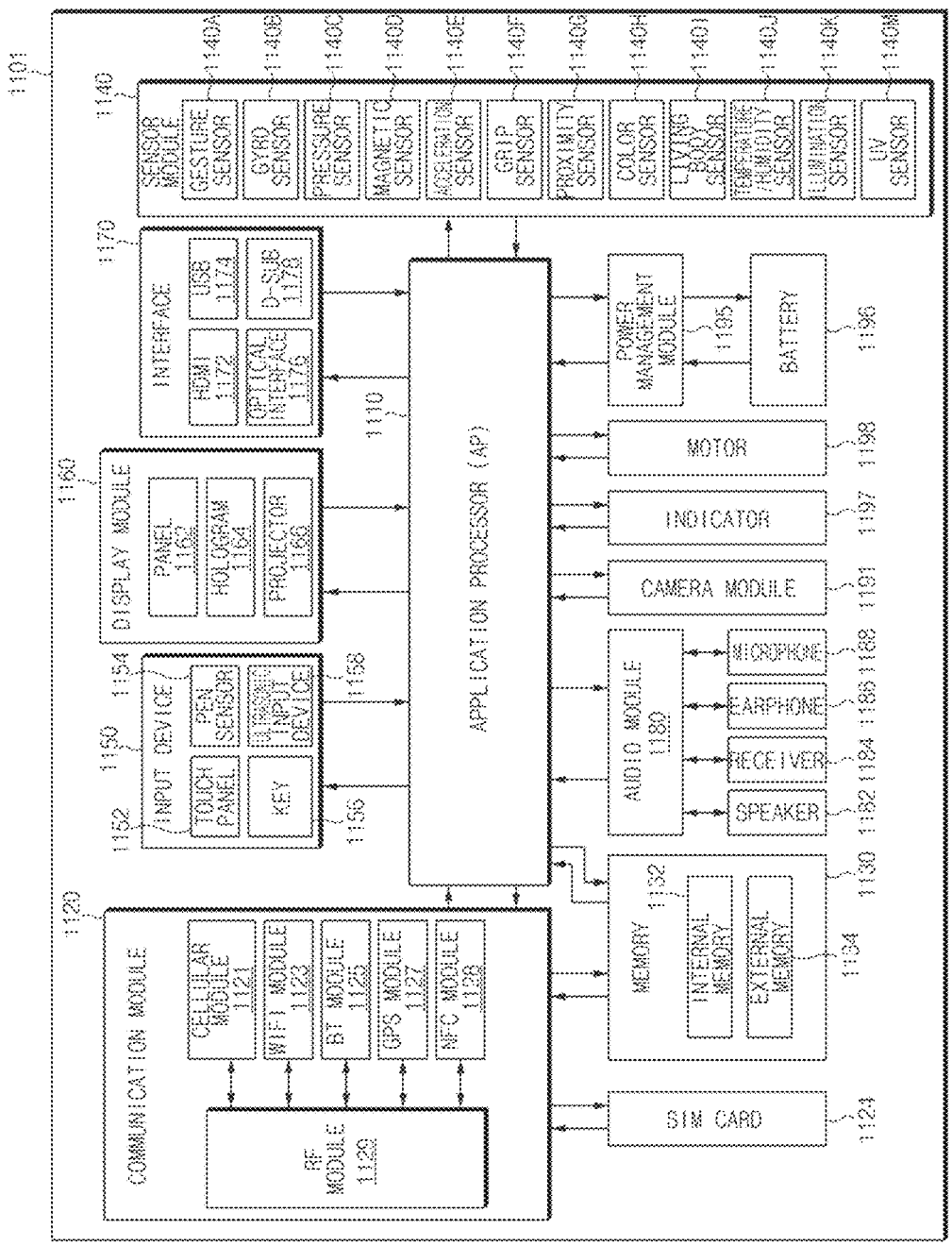
FIG. 11 illustrates a block diagram of an electronic device according to embodiments of the present disclosure.

FIG. 11 is a block diagram illustrating an electronic device according to embodiments of the present disclosure.

Referring to FIG. 11, an electronic device 1101 may include a part or all of components of an electronic device 100 shown in FIG. 1. Referring to FIG. 11, the electronic device 1101 may include at least one of one or more Application Processors (AP) 1110, a communication module 1120, a SIM card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The AP 1110 may drive an Operating System (OS) or an application to control a plurality of hardware or software components connected to the AP 1110 and may process and compute a variety of data including multimedia data. The AP 1110 may be implemented with a System on Chip (SoC), for example. According to certain embodiments, the AP 1110 may further include a Graphic Processing Unit (GPU) (not shown).

According to certain embodiments, various modules associated with processing position associated information may be implemented in the AP 1110. The AP 1110 may control associated modules to collect or compute position information and to control a function according to collecting or computing of the position information.

According to certain embodiments, various modules associated with processing position associated information may be distributed to and disposed within at least one of a CP (Communication Processor) and the AP. In this case, modules controlled by the CP may be arranged in the same chipset as the CP such that direct communication is possible. Alternatively, hardware may be configured so as to be connected with the CP through external interface.

According to certain embodiments, various modules associated with processing position associated information may be implemented in the CP. Associated modules may be controlled by the CP. In this case, the CP, a Wi-Fi, a sensor hub, and a GPS module may be connected such that direct communication with each other is possible. With regard to this, respective components may be connected through a system bus such that communication is possible even though the AP 1110 is at a power saving mode. In the event that components are implemented with different chipsets, they may be connected through an external interface such that direct communication is possible without intervention of the AP.

The communication module 1120 may transmit and receive data when there are conveyed communications between other electronic devices connected with the electronic device 1101 (e.g., an electronic device 100) through a network. The communication module 1120 may provide the memory 1130 with data from other electronic devices in response to a control of the AP 1110. Also, the communication module 1120 may provide data stored at the memory 1130 to the other electronic devices in response to a control of the AP 1110. According to certain embodiments, the communication module 1120 may include a cellular module 1121, a Wi-Fi module 1123, a BT module 1225, a GPS module 1227, an NFC module 1228, and an RF module 1229.

The cellular module 1121 may provide voice communication, video communication, a character service, or an Internet service, etc. through a communication network (e.g., an LTE, an LTE-A, a CDMA, a WCDMA, a UMTS, a WiBro, or a GSM, etc.). Also, the cellular module 1121 may perform discrimination and authentication of an electronic device within a communication network using a subscriber identification module (e.g., a SIM card 1124), for example. According to certain embodiments, the cellular module 1121 may perform at least a portion of functions that the AP 1110 provides. For example, the cellular module 1121 may perform at least a portion of a multimedia control function.

According to certain embodiments, the cellular module 1121 may include a Communication Processor (CP). Also, the cellular module 1121 may be implemented with, for example, a SoC. Though components such as the cellular module 1121 (e.g., a CP), the memory 1130, or the power management module 1195, etc. are illustrated as being components independent of the AP 1110, the AP 1110 may be implemented to include at least a portion (e.g., a cellular module 1121) of the above components.

According to certain embodiments, the AP 1110 or the cellular module 1121 (e.g., a CP) may load and process an instruction or data received from nonvolatile memories respectively connected thereto or from at least one of other elements at the nonvolatile memory. Also, the AP 1110 or the cellular module 1121 may store data received from at least one of other elements or generated by at least one of other elements at a nonvolatile memory.

According to various embodiments, the cellular module 1121 may be a first communication module 111 of a communication module 110 described with reference to FIG. 1. The cellular module 1121 may form a channel for communication with a server device 200 when the electronic device 100 collects position information, as described above. Also, the cellular module 1121 may collect neighboring cell information when the electronic device 100 computes position information.

Each of the Wi-Fi module 1123, the BT module 1125, the GPS module 1127, and the NFC module 1128 may include a processor for processing data exchanged through a corresponding module, for example. In FIG. 11, embodiments of the present disclosure are shown as the cellular module 1121, the Wi-Fi module 1123, the BT module 1125, the GPS module 1127, and the NFC module 1128 are separate blocks, respectively. According to certain embodiments, at least a portion (e.g., two or more components) of the cellular module 1121, the Wi-Fi module 1123, the BT module 1125, the GPS module 1127, and the NFC module 1128 may be included within one Integrated Circuit (IC) or an IC package. For example, at least a portion (e.g., a communication processor corresponding to the cellular module 1121 and a Wi-Fi processor corresponding to the Wi-Fi module 1123) of communication processors corresponding to the cellular module 1121, the Wi-Fi module 1123, the BT module 1125, the GPS module 1127, and the NFC module 1128 may be implemented with one SoC.

According to various embodiments, the Wi-Fi module 1123 may be a second communication module 113 of the communication module 110 described with reference to FIG. 1. Regarding that the electronic device 100 collects position information, as described above, the Wi-Fi module 1123 may form a channel for communication with a specific server device 200. Alternatively, as regards that the electronic device 100 collects position information, the Wi-Fi module 1123 may collect information of a neighboring AP.

The RF module 1129 may transmit and receive data, for example, an RF signal. Though not shown, the RF module 1129 may include a transceiver, a Power Amplifier Module (PAM), a frequency filter, or Low Noise Amplifier (LNA). Also, the RF module 1129 may further include the following part for transmitting and receiving an electromagnetic wave in a space in wireless communication: a conductor or a conducting wire. In FIG. 11, embodiments of the present disclosure is exemplified as the cellular module 1121, the Wi-Fi module 1123, the BT module 1125, the GPS module 1127, and the NFC module 1128 are implemented to share one RF module 1129. According to certain embodiments, at least one of the cellular module 1121, the Wi-Fi module 1123, the BT module 1125, the GPS module 1127, or the NFC module 1128 may transmit and receive an RF signal through a separate RF module.

The SIM card 1124 may be a card that includes a subscriber identification module and may be inserted to a slot formed at a specific position of the electronic device. The SIM card 1124 may include unique identify information (e.g., Integrated Circuit Card Identifier (ICCID)) or subscriber information (e.g., Integrated Mobile Subscriber Identify (IMSI)). According to certain embodiments, the SIM card 1124 may be a portion of a memory device 1130. When the SIM card 1124 is inserted in a slot, the AP 1110 may initialize the SIM card 1124. A cell that the electronic device 100 can search for may be decided according to subscriber information written at the SIM card 1124.

The memory 1130 may include an embedded memory 1132 or an external memory 1134. For example, the embedded memory 1132 may include at least one of a volatile memory (for example, Dynamic RAM (DRAM), Static RAM (SRAM), Synchronous Dynamic RAM (SDRAM), etc.), or a nonvolatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, or NOR flash memory). According to certain embodiments, the embedded memory 1132 may be a Solid State Drive (SSD).

The embedded memory 1132 may further include a flash drive, for example, a Compact Flash (CF), a Secure Digital (SD), a Micro-Secure Digital (SD), a mini-SD, an extreme Digital (xD), or a memory stick. The external memory 1134 may be functionally connected with the electronic device 1101 through various interfaces. According to certain embodiments, the electronic device 1101 may further include storage (or storage medium) such as a hard disk drive.

The sensor module 1140 may measure a physical quantity or may detect an operation state of the electronic device 1101. The sensor module 1140 may convert the measured or detected information to an electric signal. The sensor module 1140 may include at least one of a gesture sensor 1140A, a gyro sensor 1140B, a pressure sensor 1140C, a magnetic sensor 1140D, an acceleration sensor 1140E, a grip sensor 1140F, a proximity sensor 1140G, a color sensor 1140H (e.g., RGB sensor), a living body sensor 1140I, a temperature/humidity sensor 1140J, an illuminance sensor 1140K, or an UV sensor 1140M. Additionally or generally, though not shown, the sensor module 140 may further include an E-nose sensor, electromyography sensor (EMG) sensor, an electroencephalogram (EEG) sensor, an electrocardiogram (ECG) sensor, a photoplethysmographic (PPG) sensor, an infrared (IR) sensor, an iris sensor, or a fingerprint sensor, for example. The sensor module 1140 may further include a control circuit for controlling at least one or more sensors included therein.

According to various embodiments, the sensor module 1140 may collect a sensor signal associated with an operation of the electronic device 1101. The sensor signal that the sensor module 1140 collects may be sent to the AP 1110. The AP 1110 may analyze the sensor signal to determine whether the electronic device 1101 is at a specific operating state, for example, a movement state. Also, the AP 1110 may compute a movement direction and a movement distance of the electronic device 100 based on the sensor signal that the sensor module 1140 transmits. The AP 1110 may estimate current position information of the electronic device 100 based on recently collected position information of the electronic device 100 as well as the movement direction and the movement distance. If the GSP module 1127 enters a shadow area or it is impossible to use a WPS based position information collection manner, the AP 1110 may control to activate the sensor module 1140 automatically. The AP 1110 may use a path positioning manner using a sensor signal that the activated sensor module 1140 collects.

The input device 1150 may include a touch panel 1152, a (digital) pen sensor 1154, a key 1156, or an ultrasonic input unit 1158. The input device 1150 may include an input module 120 described with reference to FIG. 1.

The touch panel 1152 may recognize a touch input using at least one of a capacitive type, a resistive type, an infrared type, or an ultrasonic wave type. Also, the touch panel 1152 may further include a control circuit. In case of the capacitive type, a physical contact or proximity recognition is possible. The touch panel 1152 may further include a tactile layer. In this case, the touch panel 8112 may provide a tactile reaction to a user. The touch panel 1152 may generate a touch event associated with execution of a specific function using position associated information. According to certain embodiments, the touch panel 1152 may generate a touch event for selecting a type of function to be applied to an automatic screen change function and activation or inactivation of the automatic screen change function, etc.

The (digital) pen sensor 1154 may be implemented, for example, using a method, which is the same as or similar to receiving a user touch input, or using a separate sheet for recognition. The key 1156, for example, may include a physical button, an optical key, or a keypad. The ultrasonic input unit 858 may be a device, which allows the electronic device 1101 to detect a sound wave using a microphone (e.g., a microphone 1188) and to determine data through an input tool generating an ultrasonic signal, and enables wireless recognition. According to certain embodiments, the electronic device 1101 may receive a user input from an external unit (e.g., a computer or a server) connected thereto using the communication module 1120.

The display 1160 (e.g., a display module 140) may include a panel 1162, a hologram device 1164, or a projector 1166. The panel 1162 may be a liquid-crystal display (LCD) or an active-matrix organic light-emitting diode (AMO-LED). The panel 1162, for example, may be implemented to be flexible, transparent, or wearable. The panel 1162 and the touch panel 1152 may be implemented with one module. The hologram device 1164 may show a three-dimensional image in a space using interference of light. The projector 1166 may project light onto a screen to display an image. The screen, for example, may be positioned in the inside or outside of the electronic device 1101. According to certain embodiments, the display 1160 may further include a control circuit for controlling the panel 1162, the hologram device 1164, or the projector 1166.

The interface 1170, for example, may include an HDMI (high-definition multimedia interface) 1172, a USB (universal serial bus) 1174, an optical interface 1176, or a D-sub (D-subminiature) 1178. Additionally or generally, the interface 1170, for example, may include a Mobile High Definition Link (MHL) interface, a SD card/Multi-media card (MMC) interface, or an Infrared Data Association (IrDA) standard interface.

The audio module 1180 (e.g., an audio module 130 of FIG. 1) may convert a sound and an electric signal in dual directions. The audio module 1180, for example, may process sound information that is input or output through the speaker 1182, the receiver 1184, the earphone 1186, or the microphone 1188. According to certain embodiments, the audio module 1180 may output an audio signal for guiding insertion or removal of the memory device 1130.

The camera module 1191 may be a device that shoots a still picture and a moving picture. According to certain embodiments, the camera module 1191 may include one or more image sensors (e.g., a front sensor or a rear sensor), a lens (not shown), an Image Signal Processor (ISP) (not shown), or a flash (not shown) (e.g., an LED or a xenon lamp). Image data that the camera module 1191 collects may be stored at the memory device 1130 in response to a control of the AP 1110.

The power management module 1195 may manage power of the electronic device 1101. For example, the power management module 1195 may make it possible to supply a power associated with at least operation of the memory device 1130. When the memory device 1130 is removed, the power management module 1195 may block supplying of a power associated with a relevant memory operation. The power management module 1195 may supply a power needed to initialize the electronic device 1101. Though not shown, the power management module 1195, for example, may include a Power Management Integrated Circuit (PMIC) a charger IC, or a battery or fuel gauge.

The PMIC, for example, may be embedded in an IC or a SoC semiconductor. A charging method may be classified as a wired method or a wireless method. The charger IC may charge a battery and may prevent an overvoltage or an overcurrent from being input from a charger. According to certain embodiments, the charger IC may include a charger IC for at least one of a wired charging method and a wireless charging method. The wireless charging method, for example, may be a magnetic resonance method, a magnetic induction method, or an electromagnetic method. An additional circuit for wireless charging, for example, circuits such as a coil loop, a resonance circuit, or a rectifier may be further provided.

A battery gauge, for example, may measure a remnant of the battery 1196, a voltage, a current, or a temperature during charging. The battery 1196 may store or generate electricity and may supply power to the electronic device 1101 using the stored or generated electricity. The battery 1196, for example, may include a rechargeable battery or a solar battery.

The indicator 1197 may display the following specific state of the electronic device 1101 or a portion (e.g., the AP 1110) thereof: a booting state, a message state, or a charging state. According to certain embodiments, the indicator 1197 may display a state corresponding to a position information collection manner currently running. For example, the indicator 1197 may display at least one of a state corresponding to a position information collection manner based on a GPS module 1127, a state corresponding to a position information collection manner based on a WPS, a state corresponding to a position information collection manner based on a CPS, a state corresponding to a self-positioning manner, and a state corresponding to a path positioning manner.

The motor 1198 may convert an electric signal to mechanical vibration. Though not shown, the electronic device 1101 may include a processing unit (e.g., a GPU) for supporting a mobile TV. The processing unit for supporting the mobile TV, for example, may process media data that is based on the standard of Digital Multimedia Broadcasting (DMB), Digital Video Broadcasting (DVB), or media flow.

Each of the above components of the electronic device according to embodiments of the present disclosure may be implemented using one or more components, and a name of a relevant component may vary with on the kind of the electronic device. The electronic device according to various embodiments of the present disclosure may include at least one of the above components. Also, a portion of the components may be omitted, or additional other components may be further included. Also, some of the components of the electronic device according to the present disclosure may be combined to form one entity, thereby making it possible to perform the functions of the relevant components substantially the same as before the combination.

The terminology of a "module" used for the present disclosure, for example, may mean a unit including one of hardware, software, and firmware or a combination of two or more thereof. A "module," for example, may be interchangeably used with terminologies such as a unit, logic, a logical block, a component, a circuit, etc. The "module" may be a minimum unit of a component integrally configured or a portion thereof. The "module" may be a minimum unit performing one or more functions or a portion thereof. The "module" may be implemented mechanically or electronically. For example, the "module" according to the present disclosure may include at least one of an Application-Specific Integrated Circuit (ASIC) chip performing certain operations, a Field-Programmable Gate Arrays (FPGAs), or a programmable-logic device, or to be developed in the future.

According to certain embodiments, at least a portion of an apparatus (e.g., modules or functions thereof) or a method (e.g., operations) according to the present disclosure, for example, may be implemented by instructions stored in a computer-readable storage media in the form of a programmable module. The instruction, when executed by one or more processors, may perform a function corresponding to the instruction. The computer-readable storage media, for example, may be a memory. At least a portion of the programming module, for example, may be implemented (e.g., executed) by the processor. At least a portion of the programming module may include the following for performing one or more functions: a module, a program, a routine, a set of instructions, or a process.

A computer-readable recording medium may include a hard disk, a magnetic media such as a floppy disk and a magnetic tape, an optical media such as Compact Disc Read Only Memory (CD-ROM) and a Digital Versatile Disc (DVD), a magneto-optical media such as a floptical disk, and the following hardware devices specifically configured to store and perform a program instruction (e.g., a programming module): Read Only Memory (ROM), Random Access Memory (RAM), and a flash memory. Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module according to embodiments of the present disclosure may include at least one of the above elements, or a portion of the above elements may be omitted, or additional other elements may be further included. Operations performed by a module, a programming module, or other elements according to embodiments of the present disclosure may be executed sequentially, in parallel, repeatedly, or in a heuristic method. Also, a portion of operations may be executed in different sequences, omitted, or other operations may be added.

The terms "include," "comprise," and "have," or "may include," or "may comprise" and "may have" used herein indicate disclosed functions, operations, or existence of elements but does not exclude other functions, operations or elements. Additionally, in this specification, the meaning of "include," "comprise," "including," or "comprising," specifies a property, a region, a fixed number, a process, an element and/or a component but does not exclude other properties, regions, fixed numbers, processes, elements and/or components.

The meaning of the term "or" used herein includes any or all combinations of the words connected by the term "or." For instance, the expression "A or B" may indicate include A, B, or both A and B. As used herein, the term "and/or" includes any and all combinations of one or more of the associated listed items.

The terms such as "1st," "2nd," "first," "second," and the like used herein may refer to modifying various different elements of various embodiments, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other For example, a first component may be referred to as a second component and vice versa without departing from the scope of the present disclosure.

When one part is referred to as being "connected" to another part, it should be understood that the former can be "directly connected" to the latter, or "electrically connected" to the latter via an intervening part. It will be further understood that when one component is referred to as being "directly connected" or "directly linked" to another component, it means that no intervening component is present.

Terms used in this specification are used to describe embodiments of the present disclosure and are not intended to limit the scope of the present disclosure. The terms of a singular form may include plural forms unless otherwise specified.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure.

An electronic device according to various embodiments of the present disclosure may have a communication function. For instance, electronic devices may include at least one of smartphones, tablet Personal Computers (PCs), mobile phones, video phones, electronic book (e-book) readers, desktop PCs, laptop PCs, netbook computers, Personal Digital Assistants (PDAs), Portable Multimedia Players (PMPs), Motion Picture Experts Group (MPEG-1 or MPEG-2) Audio Layer 3 (MP3) players, mobile medical devices, cameras, and wearable devices (e.g., Head-Mounted-Devices (HMDs) such as electronic glasses, electronic apparel, electronic bracelets, electronic necklaces, electronic accessories, electronic tattoos, and smart watches).

According to various embodiments of the present disclosure, an electronic device may be smart home appliances having a communication function. The smart home appliances may include at least one of, for example, televisions, Digital Video Disk (DVD) players, audio devices, refrigerators, air conditioners, cleaners, ovens, microwave ovens, washing machines, air cleaners, set-top boxes, TV boxes (e.g., Samsung HomeSync™, Apple TV™ or Google TV™), game consoles, electronic dictionaries, electronic keys, camcorders, and electronic picture frames.

According to embodiments of the present disclosure, an electronic device may include at least one of various medical devices (for example, Magnetic Resonance Angiography (MRA) devices, Magnetic Resonance Imaging (MRI)

devices, Computed Tomography (CT) devices, medical imaging devices, ultrasonic devices, etc.), navigation devices, Global Positioning System (GPS) receivers, Event Data Recorders (EDRs), Flight Data Recorders (FDRs), vehicle infotainment devices, marine electronic equipment (for example, marine navigation systems, gyro compasses, etc.), avionics, security equipment, car head units, industrial or household robots, financial institutions' Automated Teller Machines (ATMs), and stores' Point Of Sale (POS) systems.

According to embodiments of the present disclosure, an electronic device may include at least one of furniture or buildings/structures having a communication function, electronic boards, electronic signature receiving devices, projectors, or various measuring instruments (for example, water, electricity, gas, or radio signal measuring instruments). An electronic device according to embodiments of the present disclosure may be one of the above-mentioned various devices or a combination thereof. Additionally, an electronic device according to embodiments of the present disclosure may be a flexible device. Furthermore, it is apparent to those skilled in the art that an electronic device according to embodiments of the present disclosure is not limited to the above-mentioned devices.

As described above, various position information receiving manners may be used adaptively according to an operation of an electronic device, thereby saving a power of the electronic device.

Also, information may be quickly provided by receiving and providing other position information with accuracy corresponding to an operating state of the electronic device.

In addition, position information with required accuracy may be provided even though it is impossible to use a specific position information receiving manner.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a cellular communication circuit configured to communicate with at least one cellular base station;
    a memory; and
    a controller operatively connected with the cellular communication circuit and the memory,
    wherein the controller is configured to:
        download a position information database including a plurality of cell identifications corresponding to the at least one cellular base station and position information of the at least one cellular base station from a server,
        store the downloaded position information database in the memory,
        obtain a current cell identification through the cellular communication circuit, and
        calculate a current position based on the current cell identification, the plurality of cell identifications corresponding to the at least one cellular base station included in the position information database, and the position information of the at least one cellular base station included in the position information database,
        determine whether the electronic device is disposed in a specific Geo-fence area using the calculated current position based on the current cell identification,
        when the electronic device is determined as being not disposed in the specific Geo-fence area, determine whether an accuracy of the calculated current position based on the current cell identification is greater than or equal to a threshold, and
        when the accuracy of the calculated current position based on the current cell identification is greater than or equal to the threshold, recalculate the current position based on the current cell identification according to a positioning period.

2. The electronic device of claim 1, wherein the controller is further configured to:
    update the position information database corresponding to a movement of the electronic device when the electronic device is moved.

3. The electronic device of claim 1, wherein the position information database further includes GPS information including at least one latitude/longitude tile having a certain area.

4. The electronic device of claim 1, wherein:
    the controller is further configured to obtain and store a center position of at least one Geo-fence area that is a predefined set of boundaries, a radius information of the at least one Geo-fence area, and at least one of cell information associated with the at least one Geo-fence area to a server, and
    each of the at least one Geo-fence area is smaller than one serving cell area.

5. The electronic device of claim 4, further comprises at least one of a GPS (Global Positioning System) module and a Wi-Fi communication circuit to communicate with at least one access point,
    wherein the controller is further configured to:
        when the accuracy of the calculated current position based on the current cell identification is less than the threshold, calculate a new current position using the GPS module or the Wi-Fi communication circuit.

6. The electronic device of claim 5, wherein the controller is further configured to calculate a new current position based on the cellular communication circuit when the electronic device gets out the specific Geo-fence area.

7. The electronic device of claim 5, wherein the controller is further configured to:
    determine the current position is in a first Geo-fence area when the electronic device enters the specific Geo-fence area; and
    output an alarm corresponding to the current position when the current position is in the first Geo-fence area.

8. The electronic device of claim 5, wherein the controller is further configured to:
    determine the current position is in a first Geo-fence area when the electronic device enters the specific Geo-fence area; and
    automatically execute a first function associated with the first Geo-fence area when the current position is in the first Geo-fence area.

9. The electronic device of claim 8, wherein the controller is further configured to:
    determine the current position is in a second Geo-fence area when the electronic device enters the specific Geo-fence area; and
    automatically execute, when the current position is in a second Geo-fence area, a second function, which is different from the first function, associated with the second Geo-fence area.

10. The electronic device of claim 5, wherein the controller is further configured to:

when a number of cells associated with the specific Geo-fence area is smaller than a predetermined required count, obtain at least one of cell information from among cells not belonging to the at least one Geo-fence area.

11. A method for providing position information of an electronic device including a cellular communication circuit, the method comprising:
downloading a position information database including a plurality of cell identifications corresponding to at least one cellular base station and position information of the at least one cellular base station from a server;
storing the downloaded position information database in a memory;
obtaining a current cell identification through the cellular communication circuit; and
calculating a current position based on the current cell identification, the plurality of cell identifications corresponding to the at least one cellular base station included in the position information database, and the position information of the at least one cellular base station included in the position information database,
determining whether the electronic device is disposed in a specific Geo-fence area using the calculated current position based on the current cell identification;
when the electronic device is determined as being not disposed in the specific Geo-fence area, determining whether an accuracy of the calculated current position based on the current cell identification is greater than or equal to a threshold; and
when the accuracy of the calculated current position based on the current cell identification is greater than or equal to the threshold, recalculating the current position based on the current cell identification according to a positioning period.

12. The method of claim 11, further comprises:
updating the position information database corresponding to a movement of the electronic device when the electronic device is moved.

13. The method of claim 11, wherein the position information database further includes GPS information including at least one latitude/longitude tile having a certain area.

14. The method of claim 11, further comprises:
obtaining and storing a center position of at least one Geo-fence area that is a predefined set of boundaries, a radius information of the at least one Geo-fence area, and at least one of cell information associated with the at least one Geo-fence area to a server, wherein each of the at least one Geo-fence area is smaller than one serving cell area.

15. The method of claim 14, further comprises:
when the accuracy of the calculated current position based on the current cell identification is less than the threshold, recalculating a new current position using a GPS (Global Positioning System) module or at least one access point information associated with a Wi-Fi communication circuit.

16. The method of claim 15, further comprises:
calculating a new current position based on the cellular communication circuit when the electronic device gets out the specific Geo-fence area.

17. The method of claim 15, further comprises:
determining the current position is in a first Geo-fence area when the electronic device enters the specific Geo-fence area; and
outputting an alarm corresponding to the current position when the current position is in the first Geo-fence area.

18. The method of claim 15, further comprises:
determining the current position is in a first Geo-fence area when the electronic device enters the specific Geo-fence area; and
automatically executing a first function associated with the first Geo-fence area when the current position is in the first Geo-fence area.

19. The method of claim 18, further comprises:
determining the current position is in a second Geo-fence area when the electronic device enters the specific Geo-fence area; and
automatically executing, when the current position is in a second Geo-fence area, a second function, which is different from the first function, associated with the second Geo-fence area.

20. The method of claim 15, further comprises:
when a number of cells associated with the specific Geo-fence area is smaller than a predetermined required count, obtaining at least one of cell information from among cells not belonging to the at least one Geo-fence area.

* * * * *